(12) United States Patent
Okuno

(10) Patent No.: US 9,135,529 B2
(45) Date of Patent: Sep. 15, 2015

(54) TERMINAL APPARATUS CONFIGURED TO PERFORM WIRELESS COMMUNICATION WITH A PRINTING APPARATUS FOR EXECUTING PRINTING PROCESSING BASED ON A PRINTING JOB

(71) Applicant: Tetsuya Okuno, Nagoya (JP)

(72) Inventor: Tetsuya Okuno, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/138,897

(22) Filed: Dec. 23, 2013

(65) Prior Publication Data

US 2014/0211246 A1 Jul. 31, 2014

(30) Foreign Application Priority Data

Jan. 29, 2013 (JP) ................................ 2013-014870

(51) Int. Cl.
*G06K 15/00* (2006.01)
*G06F 3/12* (2006.01)
(Continued)

(52) U.S. Cl.
CPC ............ *G06K 15/007* (2013.01); *G06F 3/1207* (2013.01); *G06F 3/1229* (2013.01); *G06F 3/1259* (2013.01); *G06F 3/1292* (2013.01);
(Continued)

(58) Field of Classification Search
USPC ......... 358/1.15, 1.6, 1.1, 1.14, 425, 438, 439, 358/444, 476, 501, 504, 540; 455/3.01, 455/3.05, 403, 404.2, 405, 408, 426.1, 455/426.2, 435.2, 456.1, 550.1, 575.7, 455/414.1, 566, 41.2, 41.3, 41.1; 709/226, 709/201, 203, 246, 223, 227, 217, 230
See application file for complete search history.

(56) References Cited

U.S. PATENT DOCUMENTS

2006/0245780 A1 11/2006 Yamada
2008/0170256 A1 7/2008 Matsuhara et al.
(Continued)

FOREIGN PATENT DOCUMENTS

JP 2000-125342 A 4/2000
JP 2005-292877 A 10/2005
(Continued)

OTHER PUBLICATIONS

Mar. 26, 2015—(US) Non-Final Office Action—U.S. Appl. No. 14/036,335.
(Continued)

*Primary Examiner* — Ngon Nguyen
(74) *Attorney, Agent, or Firm* — Banner & Wiftcoff, Ltd.

(57) ABSTRACT

A non-transitory computer-readable medium has a computer program stored thereon and readable by a computer of a terminal apparatus configured to perform wireless communication with a printer. The computer program, when executed by the computer, causes the computer to perform operations including: a position registration process of registering information, which indicates a first position for acquiring related information, with a storage unit in the terminal apparatus; a terminal position acquisition process of acquiring terminal position information indicative of a position of the terminal apparatus; an information acquisition process of acquiring the related information corresponding to a current status of the printer in a case where the position of the terminal apparatus is within a specific range that is defined on the basis of the first position; and an output process of outputting the acquired related information.

11 Claims, 20 Drawing Sheets

(51) Int. Cl.
   *H04W 64/00*     (2009.01)
   *H04L 29/08*     (2006.01)
   *H04W 4/02*      (2009.01)

(52) U.S. Cl.
   CPC ............... *G06K 15/40* (2013.01); *H04L 67/18* (2013.01); *H04W 4/021* (2013.01); *H04W 64/00* (2013.01)

(56) References Cited

U.S. PATENT DOCUMENTS

2012/0077515 A1* 3/2012 Oishi .................. 455/456.1
2012/0212778 A1  8/2012 Sakai
2013/0107312 A1* 5/2013 Venkatesh ............ 358/1.15

FOREIGN PATENT DOCUMENTS

JP     2007-290324 A    11/2007
JP     2008-177665 A     7/2008

OTHER PUBLICATIONS

Related U.S. Appl. No. 14/036,355 filed Sep. 25, 2013, 335 (correct typographical error per applicant's cornmunication Feb. 26, 2015).

* cited by examiner

FIG. 4

COMPLETION TIME PERIOD CALCULATION TABLE 223

| PRINTING CONDITIONS | | | COMPLETION TIME PERIOD Tf |
|---|---|---|---|
| COLOR NUMBER | RESOLUTION (dpi) | SHEET SIZE | |
| COLOR | 300 | A4 | F1(PN) |
| | | B5 | F2(PN) |
| | | A3 | F3(PN) |
| | 600 | A4 | F4(PN) |
| | | B5 | F5(PN) |
| | | A3 | F6(PN) |
| | 1200 | A4 | F7(PN) |
| | | B5 | F8(PN) |
| | | A3 | F9(PN) |
| MONOCHROME | 300 | A4 | F10(PN) |
| | | B5 | F11(PN) |
| | | A3 | F12(PN) |
| | 600 | A4 | F13(PN) |
| | | B5 | F14(PN) |
| | | A3 | F15(PN) |
| | 1200 | A4 | F16(PN) |
| | | B5 | F17(PN) |
| | | A3 | F18(PN) |

FIG. 7

| TARGET PRINTER | RANGE DEFINING INFORMATION | | | VALID/INVALID |
|---|---|---|---|---|
| | CENTER POSITION | MONITORING DISTANCE | TYPE | |
| MFP-XXXXXX | POSITION P1 | DISTANCE D1 | 1 | VALID |
| MFP-XXXXXX | POSITION P2 | DISTANCE D2 | 2 | |
| MFP-XXXXXX | POSITION P3 | DISTANCE D3 | 2 | |
| MFP-AAAAAA | POSITION P4 | DISTANCE D4 | 1 | INVALID |
| ... | | | | |

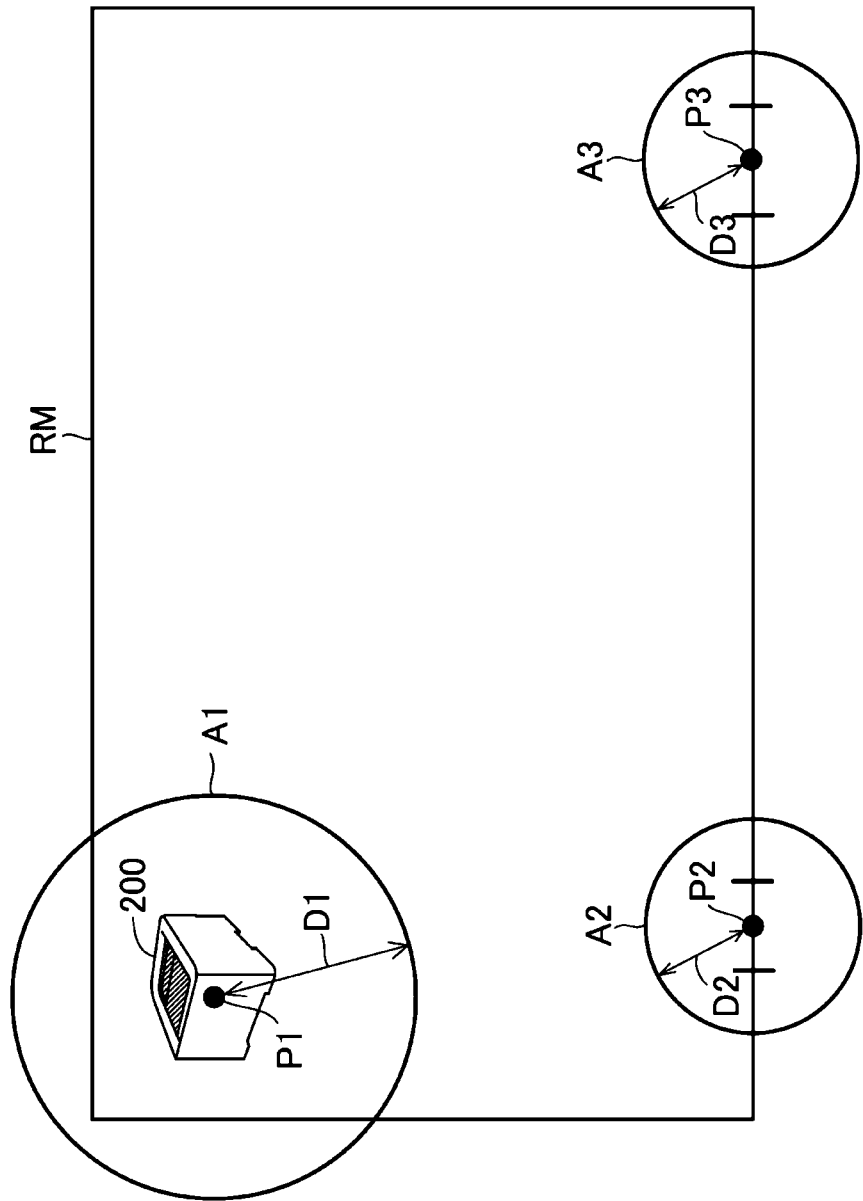

| FIG. 9A |
|---------|
| FIG. 9B |

MESSAGE TABLE MT

| | STATUS | RANGE OF FIRST-TYPE | RANGE OF SECOND-TYPE |
|---|---|---|---|
| ST1 | JOB RECEPTION STANDBY | - | - |
| ST2 | EXECUTION STANDBY | THE PRINTER THAT YOU REQUESTED THE PRINTING IS BY YOUR SIDE. BEING IN WAIT FOR THE COMPLETION OF ANOTHER PRINTING JOB AND THE PRINTING CANNOT START. PLEASE WAIT FOR A WHILE AND AGAIN CHECK THE PRINTER. | THE PRINTING JOB THAT IS REQUESTED FOR THE PRINTER HAS NOT STARTED YET. IF YOU LEAVE IT ALONE, THE PRINTED SHEET MAY BE LEFT AS IT IS. |
| ST3 | EXECUTION START OPERATION STANDBY | THE PRINTER THAT YOU REQUESTED THE SECURITY PRINTING IS BY YOUR SIDE. PLEASE COME TO THE PRINTER AND START THE PRINTING. | THE SAME AS THE LEFT |
| ST41 | UNDER IMAGE DEVELOPMENT | THE PRINTER THAT YOU REQUESTED THE PRINTING IS BY YOUR SIDE. IT TAKES TIME TO COMPLETE THE PRINTING. PLEASE AGAIN CHECK THE PRINTER. | THE SAME AS THE LEFT |
| ST42 | UNDER OUTPUT | THE PRINTER THAT YOU REQUESTED THE PRINTING IS BY YOUR SIDE. SINCE THE PRINTING WILL BE OVER AFTER FOR A WHILE, PLEASE COME TO THE PRINTER AND COLLECT THE PRINTED SHEET. | THE PRINTING JOB THAT IS REQUESTED FOR THE PRINTER WILL BE COMPLETED AFTER FOR A WHILE. IT IS RECOMMENDED TO COLLECT THE PRINTED SHEET BECAUSE THE PRINTED SHEET MAY BE LEFT AS IT IS. |

FIG. 9B

| | | | | |
|---|---|---|---|---|
| ST43 | UNDER SUSPENSION | | THE PRINTER THAT YOU REQUESTED THE PRINTING IS BY YOUR SIDE. THE PAPER JAM OCCURS, SO THAT THE PRINTING CANNOT BE CONTINUED. PLEASE COME TO THE PRINTER AND SOLVE THE ERROR. | THE SAME AS THE LEFT |
| STE | ENDING STATUS | JOB RECEPTION ERROR | THE JOB COULD NOT BE RECEIVED. | THE SAME AS THE LEFT |
| | | NON-RECOVERABLE | THE PRINTER THAT YOU REQUESTED THE PRINTING IS BY YOUR SIDE. THE NON-RECOVERABLE HINDRANCE OCCURS, SO THAT THE PRINTING IS SUSPENDED. PLEASE COME TO THE PRINTER AND CHECK THE ERROR. | THE SAME AS THE LEFT |
| | | NORMAL ENDING | THE PRINTER THAT YOU REQUESTED THE PRINTING IS BY YOUR SIDE. SINCE THE PRINTING IS COMPLETED, PLEASE COME TO THE PRINTER AND COLLECT THE PRINTED SHEET. | THE PRINTED SHEET HAVING A HIGH SECURITY LEVEL IS LEFT AT THE PRINTER. PLEASE COLLECT THE PRINTED SHEET RIGHT NOW. |
| | | CANCEL | THE PRINTER THAT YOU REQUESTED THE PRINTING IS BY YOUR SIDE. YOUR PRINTING IS CANCELLED BY ANOTHER USER. PLEASE CHECK THE PRINTING JOB. | THE SAME AS THE LEFT |

PATTERN A

FIRST ILLUSTRATIVE EMBODIMENT

SECOND ILLUSTRATIVE EMBODIMENT

MESSAGE TABLE MT2

| | STATUS | RANGE OF FIRST-TYPE | RANGE OF SECOND-TYPE |
|---|---|---|---|
| ST1 | JOB RECEPTION STANDBY | - | - |
| ST2 | EXECUTION STANDBY | THE PRINTER THAT YOU REQUESTED THE PRINTING IS BY YOUR SIDE. BEING IN WAIT FOR THE COMPLETION OF ANOTHER PRINTING JOB AND THE PRINTING CANNOT START. PLEASE WAIT FOR A WHILE AND AGAIN CHECK THE PRINTER. | THE SAME AS THE LEFT |
| ST3 | EXECUTION START OPERATION STANDBY | THE PRINTER THAT YOU REQUESTED THE SECURITY PRINTING IS BY YOUR SIDE. PLEASE COME TO THE PRINTER AND START THE PRINTING. | THE SAME AS THE LEFT |
| ST41 | UNDER IMAGE DEVELOPMENT | THE PRINTER THAT YOU REQUESTED THE PRINTING IS BY YOUR SIDE. IT TAKES TIME TO COMPLETE THE PRINTING. PLEASE AGAIN CHECK THE PRINTER. | THE SAME AS THE LEFT |
| ST42 | UNDER OUTPUT | THE PRINTER THAT YOU REQUESTED THE PRINTING IS BY YOUR SIDE. SINCE THE PRINTING WILL BE OVER AFTER FOR A WHILE, PLEASE COME TO THE PRINTER AND COLLECT THE PRINTED SHEET. | THE PRINTER THAT YOU REQUESTED THE PRINTING IS BY YOUR SIDE. THE PRINTING WILL BE OVER AFTER FOR A WHILE. |

FIG. 16B

| | | | | |
|---|---|---|---|---|
| ST43 | UNDER SUSPENSION | | THE PRINTER THAT YOU REQUESTED THE PRINTING IS BY YOUR SIDE. THE PAPER JAM OCCURS, SO THAT THE PRINTING CANNOT BE CONTINUED. PLEASE COME TO THE PRINTER AND SOLVE THE ERROR. | THE PRINTER THAT YOU REQUESTED THE PRINTING IS BY YOUR SIDE. THE PAPER JAM OCCURS, SO THAT THE PRINTING CANNOT BE CONTINUED. |
| STE | ENDING STATUS | JOB RECEPTION ERROR | THE JOB COULD NOT BE RECEIVED. | THE SAME AS THE LEFT |
| | | NON-RECOVERABLE | THE PRINTER THAT YOU REQUESTED THE PRINTING IS BY YOUR SIDE. THE NON-RECOVERABLE HINDRANCE OCCURS, SO THAT THE PRINTING IS SUSPENDED. PLEASE COME TO THE PRINTER AND CHECK THE ERROR. | THE PRINTER THAT YOU REQUESTED THE PRINTING IS BY YOUR SIDE. THE NON-RECOVERABLE HINDRANCE OCCURS, SO THAT THE PRINTING IS SUSPENDED. |
| | | NORMAL ENDING | THE PRINTER THAT YOU REQUESTED THE PRINTING IS BY YOUR SIDE. SINCE THE PRINTING IS COMPLETED, PLEASE COME TO THE PRINTER AND COLLECT THE PRINTED SHEET. | THE PRINTER THAT YOU REQUESTED THE PRINTING IS BY YOUR SIDE. THE PRINTING IS COMPLETED |
| | | CANCEL | THE PRINTER THAT YOU REQUESTED THE PRINTING IS BY YOUR SIDE. YOUR PRINTING IS CANCELLED BY ANOTHER USER. PLEASE CHECK THE PRINTING JOB. | THE SAME AS THE LEFT |

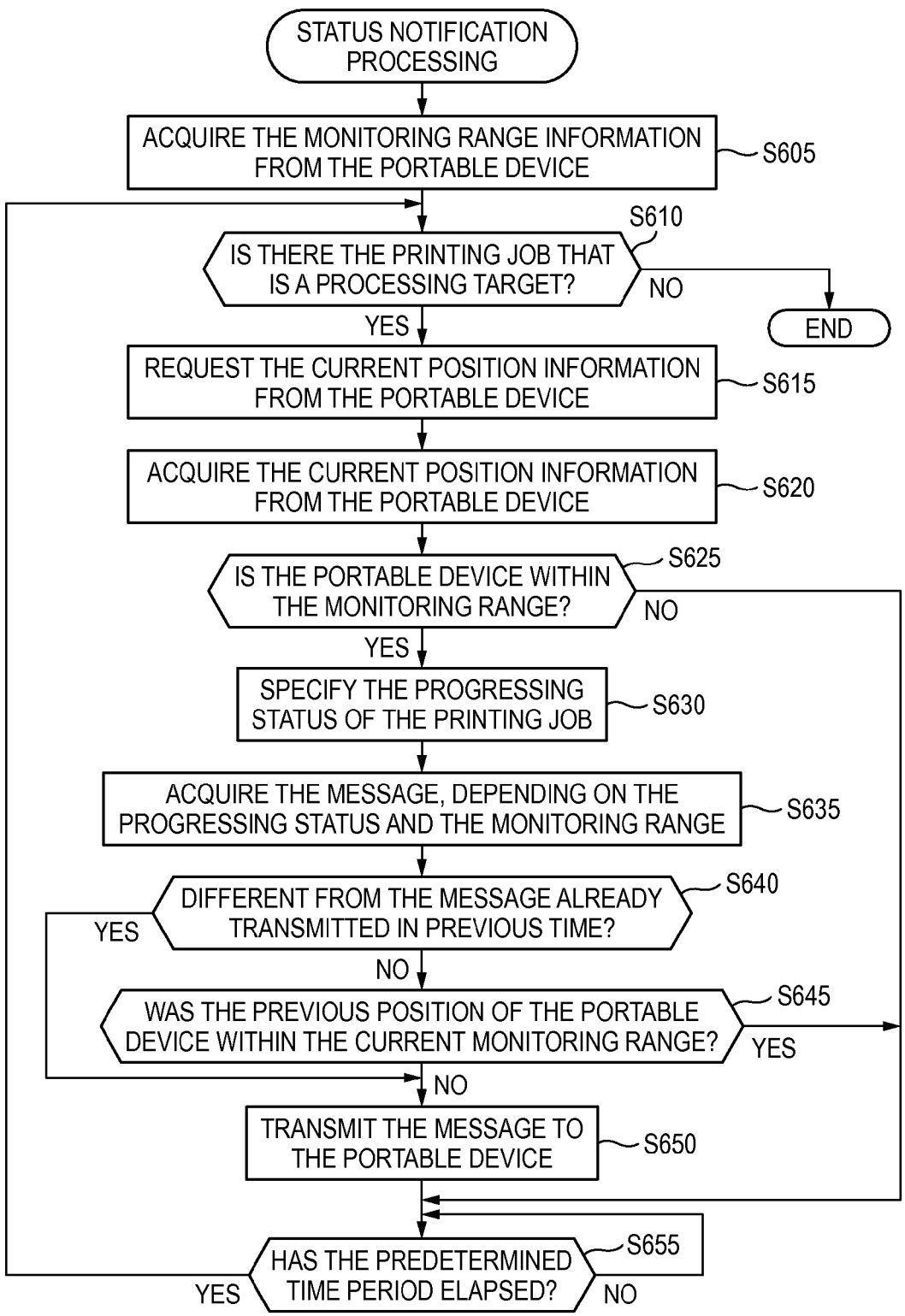

TERMINAL APPARATUS CONFIGURED TO PERFORM WIRELESS COMMUNICATION WITH A PRINTING APPARATUS FOR EXECUTING PRINTING PROCESSING BASED ON A PRINTING JOB

CROSS-REFERENCE TO RELATED APPLICATIONS

This application claims priority from Japanese Patent Application No. 2013-014870 filed on Jan. 29, 2013, the entire subject-matter of which is incorporated herein by reference.

TECHNICAL FIELD

The invention relates to a technology of controlling a portable device configured to perform wireless communication with a printing apparatus for executing printing processing based on a printing job.

BACKGROUND

Many printing apparatuses have a communication unit capable of performing wireless communication (for example, wireless LAN, Bluetooth (the registered trademark) and the like). For example, there has been disclosed a printing apparatus which, when a distance between the printing apparatus and a user's portable device executing a printing operation becomes a predetermined value or smaller, determines whether a printed document is left at the printing apparatus or collected therefrom and transmits a message depending on a result of the determination to the portable device.

SUMMARY

Illustrative aspects of the invention may be implemented as follows.

According to one illustrative aspect of the invention, there is provided a non-transitory computer-readable medium having a computer program stored thereon and readable by a computer of a terminal apparatus, which is configured to perform wireless communication with a printer, the computer program, when executed by the computer, causes the computer to perform operations comprising: a position registration process of registering information, which indicates a first position for acquiring related information, with a storage unit in the terminal apparatus; a terminal position acquisition process of acquiring terminal position information indicative of a position of the terminal apparatus; an information acquisition process of acquiring the related information corresponding to a current status of the printer in a case where the position of the terminal apparatus is within a specific range that is defined on the basis of the first position; and an output process of outputting the acquired related information.

According to another illustrative aspect of the invention, there is provided a terminal apparatus configured to perform wireless communication with a printer, the terminal apparatus comprising: a processor: and a memory storing instructions, the instructions, when executed by the processor, causing the terminal apparatus to: register information, which indicates a first position for acquiring related information, with a storage unit in the terminal apparatus; acquire terminal position information indicative of a position of the terminal apparatus; acquire the related information corresponding to a current status of the printer in a case where the position of the terminal apparatus is within a specific range defined on the basis of the first position; and output the acquired related information.

BRIEF DESCRIPTION OF THE DRAWINGS

FIG. 4 shows an example of a completion time period calculation table 223;
FIG. 7 shows an example of a monitoring range registration table AT;
FIG. 8 shows an example of a monitoring range of a first illustrative embodiment;
FIGS. 9A and 9B show an example of a message table MT of the first illustrative embodiment;
FIGS. 16A and 16B show an example of a message table MT2 of the second illustrative embodiment;
and
FIG. 17 is a flow chart of status notification processing of a third illustrative embodiment.

DETAILED DESCRIPTION

General Overview

Figures 1, 1A, 1B:
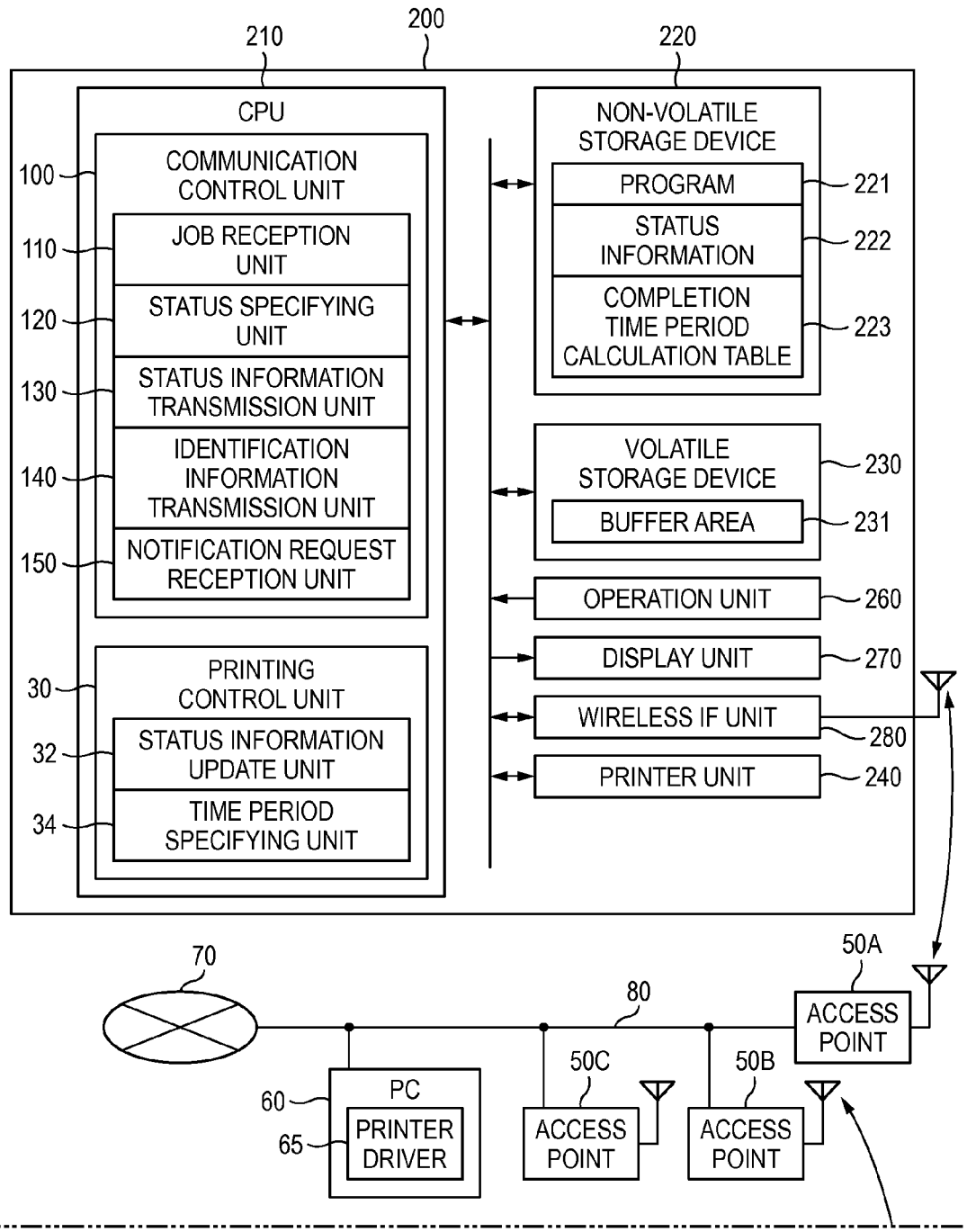
FIGS. 1A and 1B are block diagrams showing a configuration of a printing system according to an illustrative embodiment.
Figure 1B:
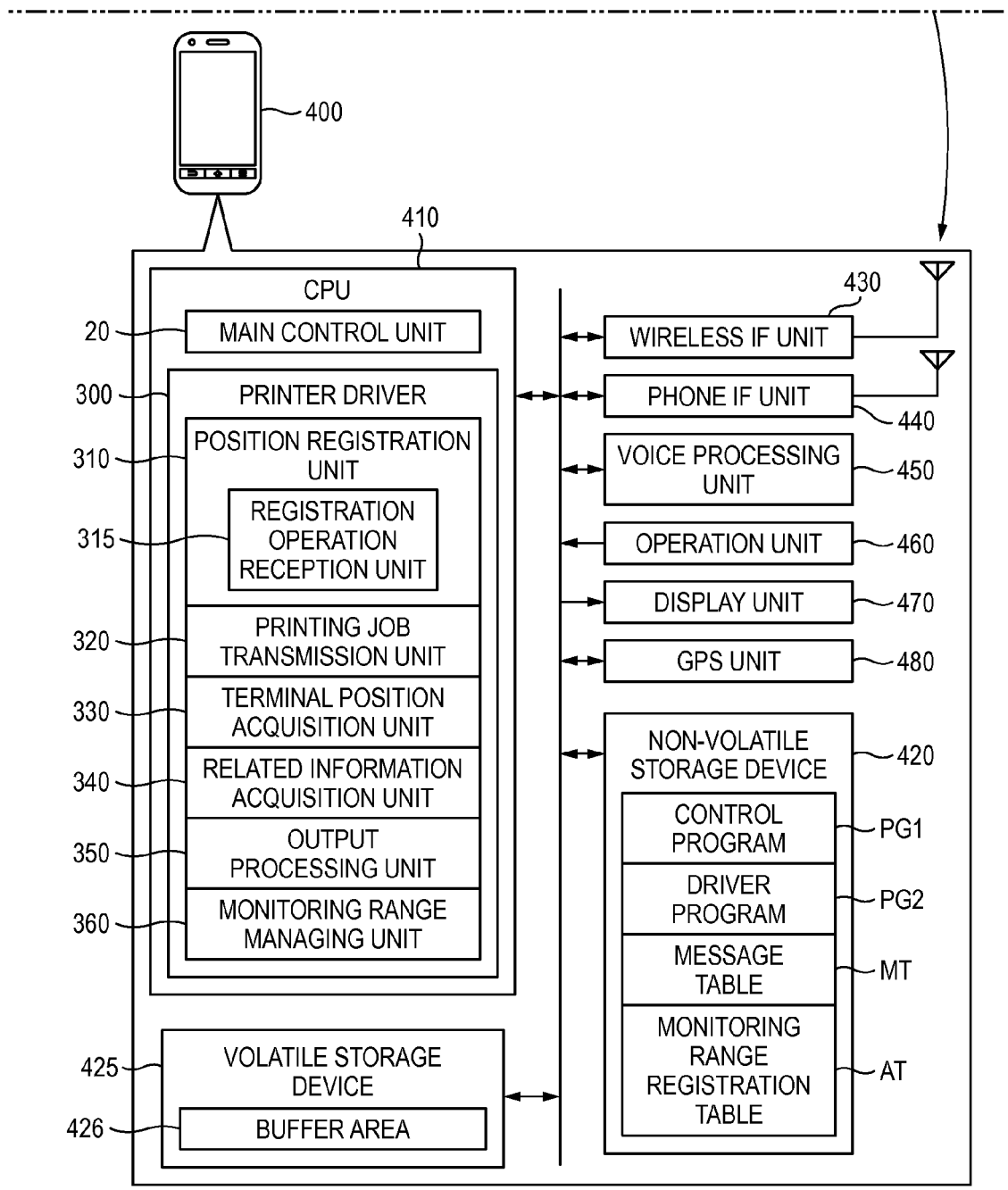

The above-described related art may not sufficiently transmit appropriate information to the user through the portable device, so that it may not enough to be convenient for the user.

Therefore, illustrative aspects of the invention provide a technology of outputting information about a printer at an appropriate position by using a portable device, thereby improving convenience for the user.

Illustrative aspects of the invention may be implemented as follows.

(1) A non-transitory computer-readable medium having a computer program stored thereon and readable by a computer of a terminal apparatus, which is configured to perform wireless communication with a printer, the computer program, when executed by the computer, causes the computer to perform operations comprising: a position registration process of registering information, which indicates a first position for acquiring related information, with a storage unit in the terminal apparatus; a terminal position acquisition process of acquiring terminal position information indicative of a position of the terminal apparatus; an information acquisition process of acquiring the related information corresponding to a current status of the printer in a case where the position of the terminal apparatus is within a specific range that is defined on the basis of the first position; and an output process of outputting the acquired related information.

According thereto, in a case where the terminal apparatus is located within the specific range that is defined on the basis of the first position, the related information corresponding to the current status of the printer is output. Therefore, the user is able to acquire the appropriate information relating to the printer at an appropriate position through the terminal apparatus by registering the information indicative of the appropriate positions with the terminal apparatus. Hence, it is possible to improve the convenience for the user.

(2) The non-transitory computer-readable medium according to (1), wherein the specific range comprises a first range that is defined on the basis of the first position and a second range that is different from the first range, and wherein the information acquisition process is configured to: acquire first related information in a case where the position of the terminal apparatus is within the first range; and acquire second related information that is different from the first related information in a case where the position of the terminal apparatus is within the second range.

According thereto, in a case where the position of the terminal apparatus is within the first range or within the second range, different related information is output to the user. Thus, the user is able to acquire more pertinent related information depending on the position of the terminal apparatus, i.e., the position of the user. Accordingly, it is possible to improve the convenience for the user.

(3) The non-transitory computer-readable medium according to (2), wherein the first range is a range having a distance to the first position which is within a first reference value, and wherein the second range is a range having a distance to the first position which is within a second reference value that is larger than the first reference value.

According thereto, different related information is output to the user depending on a distance from the first position to the terminal apparatus. Hence, the user is able to acquire more pertinent information depending on the distance from the first position.

(4) The non-transitory computer-readable medium according to (2), wherein the position registration process is further configured to register information, which indicates a second position for acquiring the related information, the second position being different from the first position, with the storage unit in the terminal apparatus, wherein the first range is a range that is defined on the basis of the first position, and wherein the second range is a range that is defined on the basis of the second position.

According thereto, each of the information indicating the first position and the information indicating the second position are registered. The first range is defined on the basis of the first position, and the second range is defined on the basis of the second position. Therefore, each of the first range and the second range can be defined appropriately. Therefore, the user is able to acquire more pertinent related information depending on the position of the terminal apparatus, i.e., the position of the user.

(5) The non-transitory computer-readable medium according to any one of (2) to (4), wherein the information acquisition process is configured to: acquire the first related information in a case where the position of the terminal apparatus is within the first range at a state where the current status of the printer is a specific status; and acquire the second related information in a case where the position of the terminal apparatus is within the second range at a state where the current status of the printer is the specific status.

According thereto, even when the current status of the printer is the same specific status, in the case where the position of the terminal apparatus is within the first range or within the second range, different related information is output to the user. Thus, the user is able to acquire more pertinent related information depending on the position of the user.

(6) The non-transitory computer-readable medium according to any one of (1) to (5), wherein the position registration process comprises reception process of receiving a specific operation on the terminal apparatus for registering the first position from a user, and wherein the position registration process is configured to register a position of the terminal apparatus upon reception of the specific operation from the user, as the first position.

According thereto, it is possible to register the first position easily by using the terminal apparatus.

(7) The non-transitory computer-readable medium according to any one of (1) to (6), wherein the position registration process is configured to associate and register information indicative of the first position and identification information for identifying the printer with the storage unit of the terminal apparatus, and wherein the position registration process is configured to register identification information for identifying the printer, which is associated information indicative of the first position, with the storage unit of the terminal apparatus.

According thereto, it is possible to register the appropriate first position for each printer. As a result, it is possible to output the appropriate related information to the terminal apparatus at an appropriate position for each printer.

(8) The non-transitory computer-readable medium according to any one of (4) to (7), wherein the first position is a position at which the printer exists, and wherein the second position is a position that is different from the position at which the printer exists.

(9) The non-transitory computer-readable medium according to any one of (1) to (8), wherein the information acquisition process is configured to: acquire first related information in a case where a distance between the first position and the position of the terminal apparatus is a first distance; and acquire second related information that is different from the first related information in a case where the distance between the first position and the position of the terminal apparatus is a second distance.

According thereto, different message is output to the terminal apparatus depending on the distance from the first position to the terminal apparatus. As a result, the user is able to acquire appropriate related information depending on the distance from the first position. Accordingly, it is possible to improve the convenience for the user.

Incidentally, the invention can be implemented in various forms such as control devices of reading apparatuses, computer programs for implementing the functions or methods of those devices, and non-transitory computer-readable medium having the computer programs stored thereon.

Illustrative Embodiments

A. First Illustrative Embodiment

A-1. Configuration of System

Hereinafter, illustrative embodiments of the invention will be described. FIG. 1 is a block diagram showing a configuration of a printing system according to an illustrative embodiment. The system includes a printer 200, a local area network (which will be referred to as "LAN") 80 that is connected to the Internet 70, a plurality of access points 50A to 50C that is connected to the LAN 80, a portable device 400 and a personal computer (which will be referred to as "PC") 60 that is connected to the LAN 80.

The respective access points 50A to 50C function as the access points of a wireless LAN using a communication protocol defined by IEEE 802.11a/b/g/n standards and the like. The printer 200 and the portable device 400 are able to perform wireless communication using an infrastructure mode through the access points 50A to 50C. The infrastructure mode is a mode with which a plurality of wireless LAN terminal apparatuses performs data communication through the access points.

The LAN 80 is a wired network that is established in a building, for example, based on the Ethernet (the registered trademark) standards. The access points 50A to 50C are arranged with being dispersed in the building to thereby establish the wireless network. As a result, the portable device 400 can connect to the LAN 80 through the wireless network at any place in the building.

The printer 200 includes a CPU (which is an abbreviation of "Central Processing Unit") 210, a non-volatile storage device 220 such as a hard disk drive and a flash memory, a volatile storage device 230 such as a RAM (which is an abbreviation of "Random Access Memory"), a printer unit 240 that is a print engine printing an image by a predetermined method (for example, inkjet, laser and the like), an operation unit 260 such as a touch panel and a button, a display unit 270 that includes a display panel such as liquid crystals overlapping with the touch panel and a wireless interface unit (which will be referred to as "wireless IF unit") 280 that functions as an interface for performing data communication with an external apparatus such as a PC and a portable device.

The volatile storage device 230 is provided with a buffer area 231 that temporarily stores therein a variety of intermediate data, which is generated when the CPU 210 performs processing. The non-volatile storage device 220 stores therein a computer program 221 for controlling the printer 200, status information 222 and a completion time period calculation table 223.

The computer program 221 is beforehand stored in the non-volatile storage device 220 upon shipment of the printer 200, for example. Also, the computer program 221 may be provided with being recorded in a CD-ROM or may be downloaded from a server.

The status information 222 is information indicating a status of the printer 200, specifically, a progressing status of printing processing (FIG. 2), in the printing processing that will be described later. The status information 222 may be stored in the volatile storage device 230.

The completion time period calculation table 223 is a table in which printing conditions (for example, a resolution, a sheet size, the color number (e.g., color/monochrome) and the like) are associated with a printing completion time period, which is time period from starting of the printing processing to completion thereof.

The CPU 210 executes the computer program 221, thereby entirely controlling the printer 200. Specifically, the CPU 210 functions as a printing control unit 30 for executing a printing operation and a communication control unit 100 that executes communication processing including status notification processing, which will be described later. The printing control unit 30 has a function (not shown) controlling the printer unit 240 and a status information update unit 32 that updates the status information 222 and a time period specifying unit 34 that specifies a completion time period, which is required to complete the printing (to complete an output of a printed document), during the printing processing.

The communication control unit 100 has a job reception unit 110, a status specifying unit 120, a status information transmission unit 130, an identification information transmission unit 140 and a notification request reception unit 150. The specific processing that is executed by the respective functional units will be described below.

The wireless IF unit 280 includes an antenna and performs wireless communication through the access point 50A, i.e., wireless communication based on the infrastructure mode. The wireless IF unit 280 is used for data communication with the portable device 400 and with the PC 60, for example, as described below.

The portable device 400 is a multi-functional portable phone that is referred to as a smart phone, for example. The portable device 400 mainly has a CPU 410, a non-volatile storage device 420 such as a hard disk drive and a flash memory, a volatile storage device 425 such as a RAM, a wireless IF unit 430, a phone IF unit 440, a voice processing unit 450 that includes a speaker and a microphone and is provided to implement a phone function and the like, an operation unit 460 including a touch panel, an operation key and the like, a display unit 470 that includes a liquid crystal panel overlapping with the touch panel and the like, and a GPS unit 480.

The wireless IF unit 430 includes an antenna and performs wireless communication through the access point 50, i.e., wireless communication based on the infrastructure mode. The wireless IF unit 430 is used to transmit a printing job to the printer 200 and to receive the status information from the printer 200, for example, as described below.

The phone IF unit 440 includes an antenna and performs wireless communication with a base station (not shown), based on a mobile phone communication method (for example, W-CDMA). The phone IF unit 440 is used for access to the Internet 70 through a phone and the base station (not shown), for example.

The GPS unit 480 includes a receiver that receives electric waves (GPS signals) transmitted from artificial satellites configuring a GPS (which is an abbreviation of "Global Positioning System"). The GPS unit 480 can acquire position information indicating a current position of the portable device 400, based on the received GPS signals. The position information is three-dimensional coordinate information including values indicating a latitude, a longitude and an altitude, respectively. The position information may be two-dimensional coordinate information including values indicating a latitude and a longitude, respectively.

The non-volatile storage device 420 stores therein a control program PG1, a printer driver program PG2, a message table MT and a monitoring range registration table AT. The control program PG1 is a program that implements basic functions of the portable device 400 such as a function of OS (which is an abbreviation of "Operating System"), a phone function, a control function of the GPS unit 480 and the like. The control program PG1 is provided by a manufacturer of the portable device 400, for example, and is beforehand stored upon the shipment. The printer driver program PG2 is a program that implements a function for remotely controlling the printer 200. The printer driver program PG2 is a program (which is also referred to as 'application') that adds a new function to the portable device 400 and is provided by a provider (for example, a manufacturer of the printer 200) different from the manufacturer of the portable device 400 so that it can be downloaded from a predetermined server. Also, the printer driver program PG2 may be provided by the manufacturer of the portable device 400 and may be beforehand stored upon the shipment. The message table MT is a table in which a combination of a status of the printer 200 and a monitoring range and a message corresponding to the combination are associated and recorded, which will be described later. The monitoring range registration table AT is a table in which the monitoring range and the printer, which is to use the monitoring range, are associated and recorded, which will be described later.

The volatile storage device 425 is provided with a buffer area 426 that temporarily stores therein a variety of intermediate data, which is generated when the CPU 410 performs processing.

The CPU 410 executes the control program PG1 to thus function as a main control unit 20 that implements the basic functions of the portable device 400. Also, the CPU 410 executes the printer driver program PG2 to thus function as a printer driver 300. The printer driver 300 has a position registration unit 310, a printing job transmission unit 320, a terminal position acquisition unit 330, a related information acquisition unit 340, an output processing unit 350 and a monitoring range managing unit 360. The position registration unit 310 has a registration operation reception unit 315.

The PC 60 is a well-known calculator that includes a CPU, a storage device such as a ROM (which is an abbreviation of "Read Only Memory"), a RAM, a hard disk drive and the like, a keyboard and a display. The PC 60 has a printer driver program installed therein and has a function as a printer driver 65.

A-2: Printing Processing of Printer 200

When the job reception unit 110 of the printer 200 receives a printing job from an external device (for example, the PC 60 or the portable device 400), the printing control unit 30 controls the printer unit 240 to thus execute the printing processing, based on the printing job.

Figure 2:
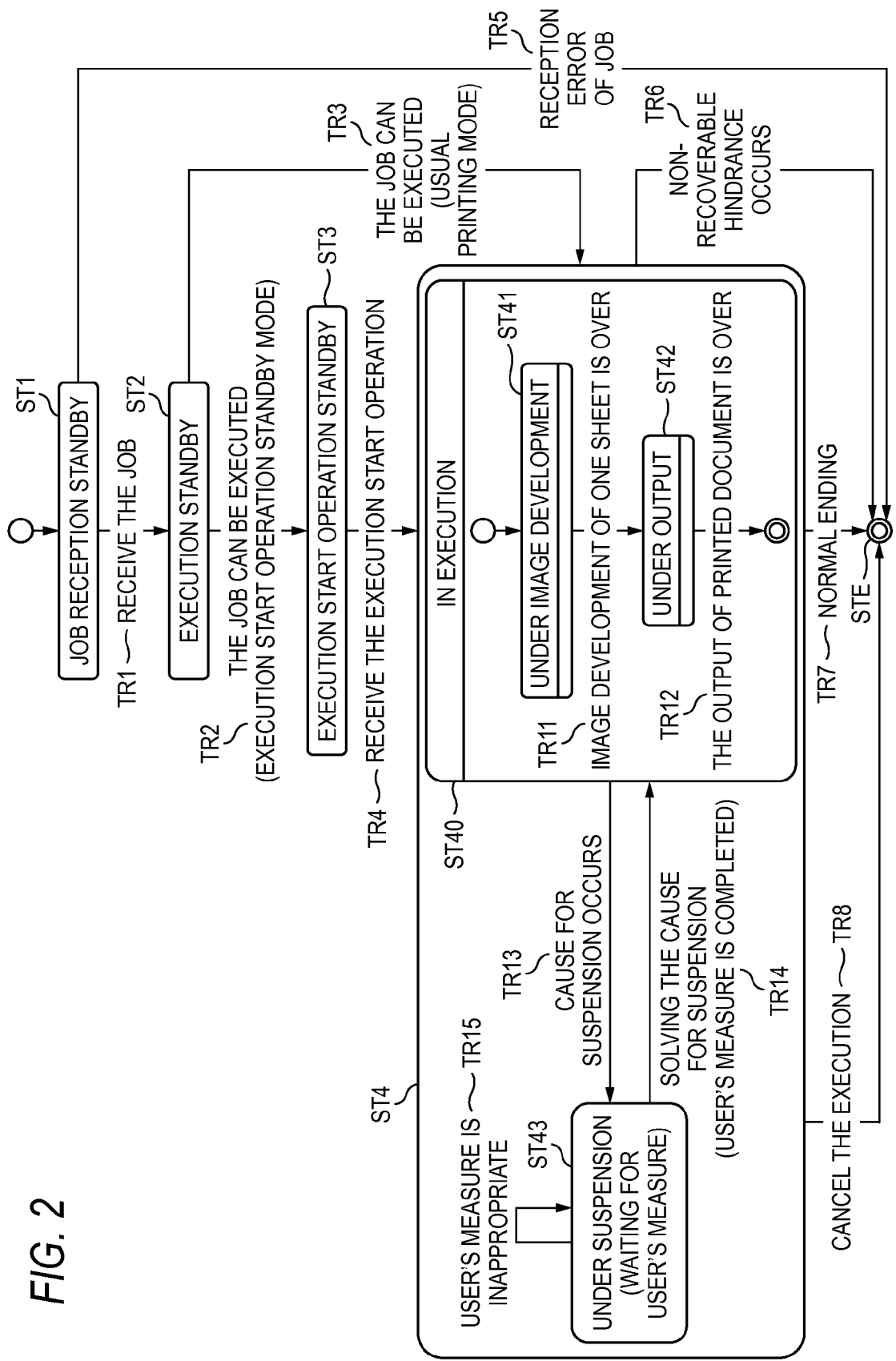
FIG. 2 is a state transition diagram illustrating printing processing.

FIG. 2 is a state transition diagram illustrating the printing processing. First, a status shift of the printer 200 from the reception of the printing job until a printed document is output based on the printing job will be described. The printer 200 can have a plurality of statuses in correspondence to a plurality of printing jobs. For example, even when the printer 200 is executing the printing processing based on one printing job, the printer can receive another printing job. However, here, in order to avoid the complexity, the status shift based on one printing job is described.

In FIG. 2, a status ST1 is a status where the printer 200 (the printing control unit 30 and the printer unit 240) waits for a printing job (a job reception standby status ST1). At the job reception standby status ST1, when a printing job is received (TR1), the printer 200 shifts to a status (an execution standby status ST2) where the printer waits for execution of the printing processing based on the printing job. At the execution standby status ST2, when the printing processing based on the printing job is enabled to be executed (TR2, TR3), i.e., when the printing processing based on the printing job, which has been received earlier than the printing job received at TR1, is over, the printer 200 shifts to an execution start operation standby status ST3 or printing processing status ST4. That is, when the printing mode is an execution start operation standby mode, the printer 200 shifts to the execution start operation standby status ST3 and when the printing mode is a usual printing mode, the printer 200 shifts to the printing processing status ST4.

Here, the execution start operation standby mode is a printing mode in which a specific operation for the operation unit 260 is requested, i.e., a printing mode in which the printing processing does not start until a user performs a specific operation, so as to perform the printing processing (the output of the printed document). The specific operation for the operation unit 260 includes a pushing operation of a predetermined button (a start button and the like), an operation of bringing a device (a portable device and the like) having a non-contact IC card or NFC (Near Field Communication) function close to a reading unit (not shown) of the operation unit 260, and the like. In this illustrative embodiment, it is assumed that the execution start operation standby mode is a printing mode (which is also referred to as a secure mode) in which a user is obliged to input the identification information such as a password before the printing processing so as to suppress the printed document from being stolen, for example. In the meantime, the usual printing mode is a printing mode in which a specific operation for the operation unit 260 is not requested so as to perform the printing processing (the output of the printed document).

At the execution start operation standby status ST3, when an execution start standby operation is received (TR4), the printer 200 shifts to a printing processing status ST4. As can be seen from the above description, it can be said that the execution start operation standby status ST3 is a status before the specific operation is received and that the printing processing status ST4 is a status after the specific operation is received.

The printing processing status ST4 includes a status in execution ST40 and a status under suspension ST43. When a cause for suspension does not occur upon the shift to the printing processing status ST4, the printer 200 shifts to the status in execution ST40. When a cause for suspension occurs, the printer 200 shifts to the status under suspension ST43. Here, the cause for suspension includes a specific cause for suspension, which requires a measure for the printer 200 by the user, specifically, the paper jam, the out-of-printing material (toner, ink and the like) and the out-of-sheet. At the status in execution ST40, when a cause for suspension occurs (TR13), the printer 200 shifts to the status under suspension ST43. At the status under suspension ST43, when the cause for suspension is solved (TR14), i.e., when the user's measure for solving the cause for suspension is completed, the printer 200 shifts to the status in execution ST40. At the status under suspension ST43, when the user's measure is made but the measure is not appropriate (TR15), the printer 200 is still in the status under suspension ST43. Here, the user's measure includes replenishment of the sheet, exchange of a container (a toner cartridge, an ink cartridge and the like) of the printing material, removal of the jammed sheet and the like. As can be seen from the above description, it can be said that the status under suspension ST43 is a status where the printing processing is suspended and that the status in execution ST40 is a status where the printing processing is not suspended.

The status in execution ST40 includes a status under image development ST41 and a status under output ST42. When the printer shifts to the status in execution ST40, the printer 200 is first at the status under image development ST41. The status under image development ST41 is a status where the printer 200 (the printing control unit 30) is executing print data generation processing of generating print data by using image data included in the printing job. The print data generation processing includes rasterization processing, color conversion processing and halftone processing, for example. The rasterization processing is processing of converting the image data (for example, image data described by the PDL, image data compressed into the JPEG format and the like) included in the printing job into bitmap data (specifically, RGB image data). The color conversion processing is processing of converting the RGB image data into image data (specifically, CMYK image data) of a color coordinate system corresponding to a color of the printing material. The halftone processing is processing of converting the CMYK image data into dot data (for example, binary image data), which indicates a forming state of dots, for each component and for each pixel by using a dithering method or an error diffusion method.

The status under output ST42 is a status where the printer 200 (the printer unit 240) is executing output processing of outputting a printed document by using the print data. That is, when the printer unit 240 is a laser-type print engine, the output processing includes exposure, developing, transfer and fixing processes.

At the status under image development ST41, when the image development of one sheet is over (TR11), i.e., when the print data of one sheet is generated, the printer 200 shifts to the status under output ST42. Actually, in this illustrative embodiment, after the image development of one sheet is over, the image development (the generation of the print data) by the printing control unit 30 and the output of the printed document by the printer unit 240 are executed in parallel. However, in this illustrative embodiment, after the output of the printed document starts, it is determined that the status of the printer 200 is the status under output ST42, irrespective of whether the image development is being executed in parallel. Incidentally, different from this illustrative embodiment, a case where the output of the printed document by the printer unit 240 is sequentially (serially) executed is also described. In this case, when all the image development is over at the status under image development ST41, i.e., when all the print data based on the printing job is generated, the printer 200 shifts to the status under output ST42. It can be said that the status under image development ST41 or the status under output ST42 is a status before the output processing is completed.

At the status under output ST42, when all the printed documents are output (TR12), the status in execution ST40 is over. In this case, the printing processing is normally over (TR7), so that the printer 200 shifts from the printing processing status ST4 to an ending status STE. It can be said that the status where the printer shifts to the ending status STE as the printing processing (the output processing) is normally over is a status after the output processing is completed.

Also, at the printing processing status ST4, when an instruction to cancel the execution of the printing is received through the operation unit 260 (TR8), the printer 200 shifts to the ending status STE. Also, at the printing processing status ST4, when a non-recoverable hindrance occurs (TR6), the printer 200 shifts to the ending status STE. The non-recoverable hindrance may include a serious failure of the printer 200, data lost of the printing job due to the power failure, and the like.

Also, at the job reception standby status ST1, when a reception error of the printing job occurs (TR5), the printer 200 shifts to the ending status STE. The reception error of the printing job may include a case where the printer 200 cannot receive the whole printing job due to the communication failure, for example.

As described above, the statuses of the printer 200 (ST2 to ST4, ST40 to ST43) from the reception of the printing job to the ending status STE are recorded in the status information 222. Here, when the printer 200 is at the status under suspension ST43, the cause for suspension (the out-of-sheet, the paper jam, the out-of-printing material and the like) is recorded in the status information 222. Also, when the printer 200 is at the ending status STE, the cause of the shift to the ending status STE (specifically, the normal ending TR7, the execution cancel TR8, the non-recoverable hindrance TR6 and the job reception error TR5) is also recorded in the status information 222. That is, the status information update unit 32 of the printing control unit 30 updates the status information 222 whenever the status of the printer 200 shifts so that the status (the progressing status of the printing processing) of the printer 200 can be specified by referring to the status information 222.

Here, when the printer 200 is at the printing processing status ST4, the time period specifying unit 34 of the printing control unit 30 executes completion time period specifying processing of specifying a completion time period that is required until the output processing of the printed document is completed.

Figure 3:
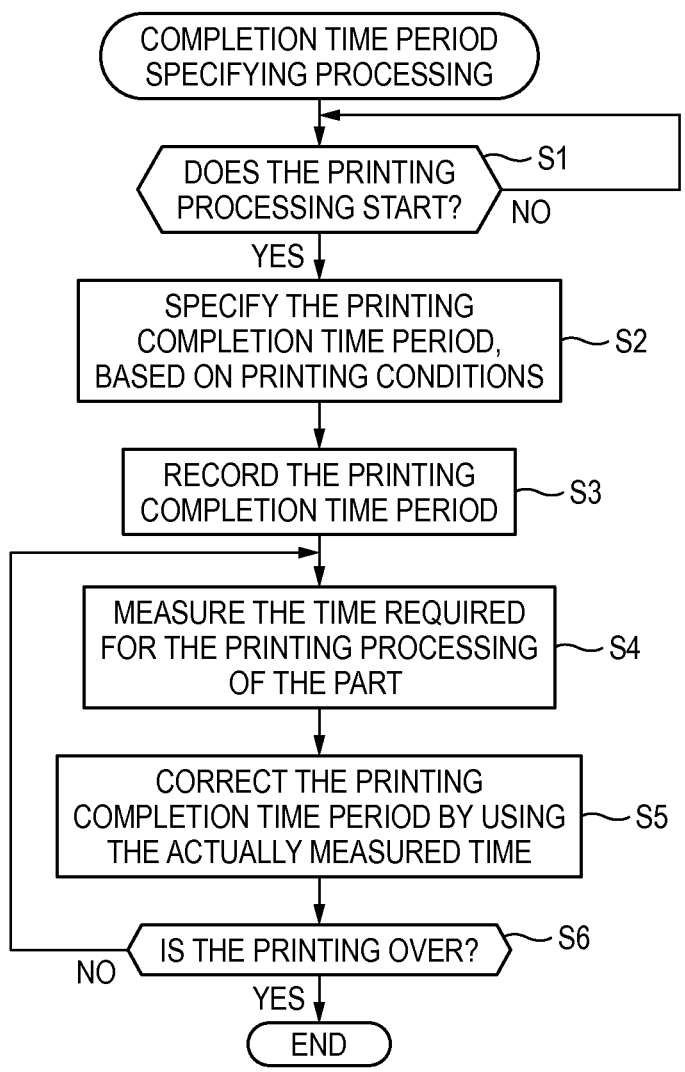
FIG. 3 is a flow chart of completion time period specifying processing.

FIG. 3 is a flow chart of the completion time period specifying processing.

In step S1, the time period specifying unit 34 determines whether the printing processing based on the printing job starts, i.e., whether the printer 200 is at the printing processing status ST4 as regards the printing job that is a target. When the printing processing based on the printing job does not start (step S1: NO), the time period specifying unit 34 stands by until the printing processing starts. When the printing processing based on the printing job starts (step S1: YES), the time period specifying unit 34 specifies a printing completion time period Tf, based on the printing conditions (step S2).

FIG. 4 shows an example of the completion time period calculation table 223. In this example, a function Fn (PN), which calculates the printing completion time period Tf by using the number of printed sheets PN as a parameter, is associated with a combination of the color number (for example, color or monochrome), the resolution (which is indicated by the dpi (dot per inch)) and the sheet size (for example, A4, B5, A3 and the like) (in the example of FIG. 4, n is an integer of 1 or larger and 18 or smaller). The time period specifying unit 34 can calculate the printing completion time period Tf based on the printing conditions by referring to the completion time period calculation table 223.

In step S3, the time period specifying unit 34 records the printing completion time period Tf specified in step S2 in the status information 222. The printing completion time period Tf recorded in the status information 222 is updated by a timer and the printing completion time period Tf can be specified by referring to the status information 222 at any timing during the printing processing.

In step S4, the time period specifying unit 34 specifies time that is required for the printing processing of a part of the documents to be output. For example, in this illustrative embodiment, whenever the printed document of one sheet is output, actually measured time that is required from the start of the printing processing is specified. In step S5, the printing completion time period Tf recorded in the status information 222 is corrected using the actually measured time that is required for the printing processing of a part of the documents to be output. For example, when the actually measured time up to a fifth page is specified, the time period specifying unit 34 calculates time, which is required to print the first to fifth pages on the basis of the printing conditions, by referring to the completion time period calculation table 223, and compares the same with the actually measured time. Then, the time period specifying unit 34 corrects the printing completion time period Tf recorded in the status information 222 by using a difference (delay or fast (increase)) between the actually measured time and the required time, which is obtained by referring to the completion time period calculation table 223. For example, the time period specifying unit 34 may correct the printing completion time period Tf simply by adding delayed time to the printing completion time period Tf or by subtracting the increased time from the printing completion time period Tf. Also, when the image development (the generation of the print data) and the output of the printed document are alternately repeated (serial processing) for each sheet, the time period specifying unit 34 may use a value, which is obtained by multiplying the actually measured value required for the printing processing of one sheet by the number of printed sheets PN, as the printing completion time period Tf.

In step S6, the time period specifying unit 34 determines whether the printing processing is completed, i.e., whether all the printed sheets based on the printing job are output. When the printing processing is not completed (step S6: NO), the time period specifying unit 34 returns to step S4 and repeats the processing of measuring the time required for the printing processing of the part of the printed documents (step S4) and correcting the printing completion time period Tf by using the actually measured time (step S5). When printing processing is completed (step S6: YES), the time period specifying unit 34 ends the completion time period specifying processing.

When the above-described completion time period specifying processing is executed, it is possible to record the printing completion time period Tf of high precision in the status information 222 at any timing during the printing processing. In the meantime, the delay of the printing processing may occur (1) in a case where when a data amount of the printing job is large and it is thus necessary to divide and receive the printing job several times during the printing processing, it takes much time to receive the printing job due to the congestion of the network, (2) in a case where the printer 200 performs the other processing (for example, the processing of controlling a scanner, receiving FAX data, and the like) in parallel with the printing processing, and the like. The fast printing processing may occur in a case where when the printing image is simple, the time required for the generation of the print data is shorter than expected, for example.

A-3: Monitoring Range and Registration of Monitoring Range

A monitoring range, which is used in monitoring range managing processing (FIG. 11) and related information display processing (FIG. 12) (which will be described later), and monitoring range registration processing of registering the monitoring range are described.

Figure 5:
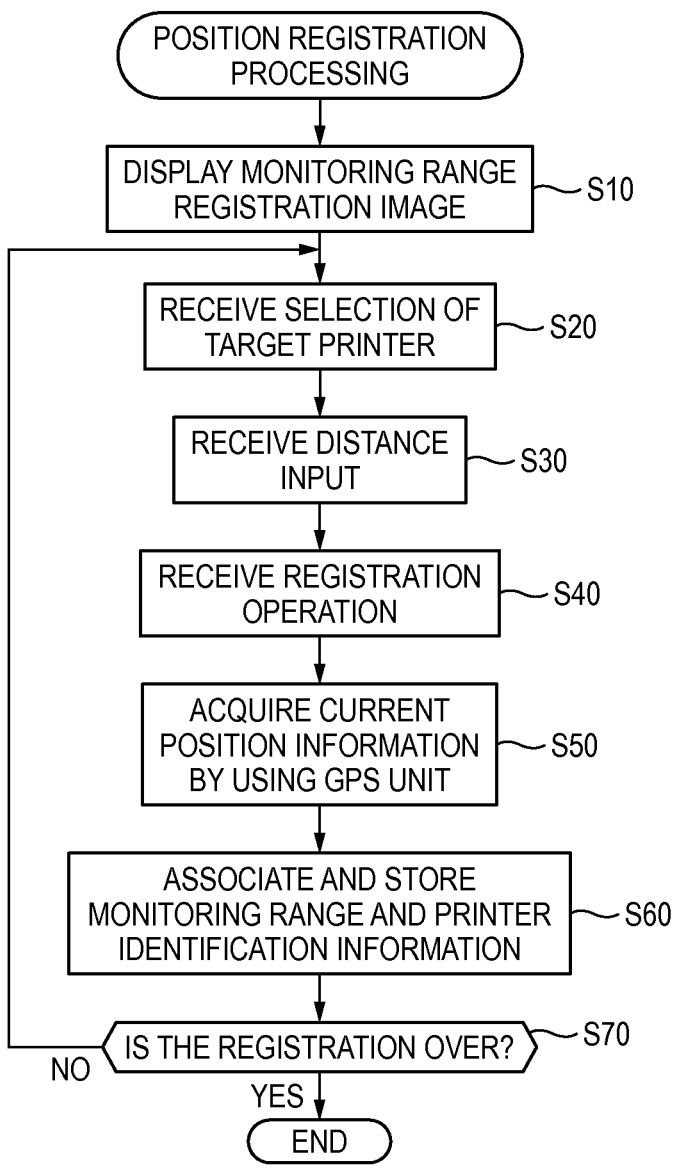
FIG. 5 is a flow chart of position registration processing.

FIG. 5 is a flow chart of position registration processing. The position registration processing is one of the processing that is executed by the printer driver program PG2 (the printer driver 300). The position registration processing is processing of registering a monitoring range (a monitoring area), which is used in the monitoring range managing processing (FIG. 11) and the related information display processing (FIG. 12) (which will be described later), with the portable device 400 in advance. The position registration processing is executed in accordance with a user's instruction before the user transmits the printing job to the printer 200 by using the portable device 400 (the printer driver 300) or before the user transmits the printing job to the printer 200 by using the PC 60.

When the position registration processing starts, the position registration unit 310 displays a monitoring range registration image UI1 on the display unit 470 of the portable device 400, in step S10.

Figure 6:
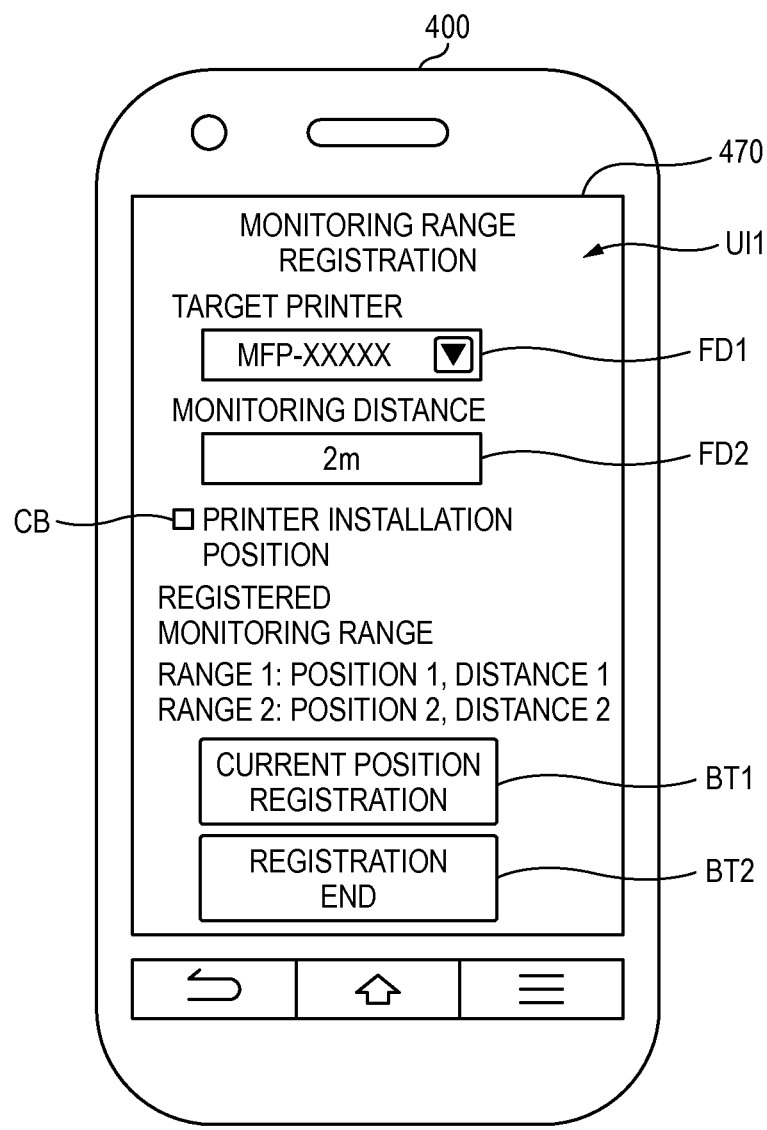
FIG. 6 shows an example of a monitoring range registration image UI1.

FIG. 6 shows an example of the monitoring range registration image UI1. The monitoring range registration image UI1 of FIG. 6 includes a first field FD1, a second field FD2, a check box CB, a registration button BT1 and an ending button BT2.

In step S20, the registration operation reception unit 315 of the position registration unit 310 receives a selection of a target printer through the first field FD1. The first field FD1 is a field for inputting a printer (a target printer) with which a monitoring range to be registered is associated. For example, the first field FD1 is configured so that a target printer can be input using a pull-down menu for selecting one or more printers that are beforehand registered by the user and to which a printing job can be transmitted.

In step S30, the registration operation reception unit 315 receives an input of a monitoring distance through the second field FD2. The second field FD2 is a field for inputting a monitoring distance (a unit thereof is meter, for example) for defining a magnitude of the monitoring range.

In step S40, the registration operation reception unit 315 receives a registration operation of the monitoring range through the registration button BT1. When the registration button BT1 is pushed by the user, the position registration unit 310 acquires current position information, which indicates a current position of the portable device 400, by using the GPS unit 480, in step S50. The current position information is three-dimensional coordinate information including values indicating a latitude, a longitude and an altitude, respectively. That is, when the registration button BT1 is pushed, in other words, the registration operation is received from the user at a state where the target printer and the monitoring distance are input in the fields, the position at which the portable device 400 is located is acquired as a center position of the monitoring range (which will be described later). When the user carries the portable device 400, moves to a center position of the monitoring range and pushes the registration button BT1, the user can easily register the center position of the monitoring range with the portable device 400. Here, when pushing the registration button BT1, the user can check the check box CB. When a position to be registered is an installation position of the target printer (the printer 200), the user checks the check box CB, and when a position to be registered is a position different from the installation position of the target printer, the user does not check the check box CB.

In step S60, the position registration unit 310 associates and registers range defining information, which defines the monitoring range, and printer identification information (for example, a model number, a serial number and the like) for identifying the target printer with the monitoring range registration table AT (FIG. 1).

FIG. 7 shows an example of the monitoring range registration table AT. In this illustrative embodiment, the monitoring range is a spherical range having the center position as a center and the monitoring distance as a radius. As shown in FIG. 7, the position registration unit 310 registers, as the range defining information, a set of the current position information acquired in step S40 and the distance information indicative of the monitoring distance received in step S30 with the monitoring range registration table AT. The current position information acquired in step S40 is treated as information indicating the center position of the monitoring range. In the example of FIG. 7, the three monitoring ranges are associated with the printer identification information (specifically, 'MFP-XXXXX') for identifying one target printer and one monitoring range is associated with another target printer (MFP-AAAAA). Incidentally, it is possible to describe information, which indicates whether the registered monitoring range is currently valid or invalid, for each target printer in the monitoring range registration table AT (which will be described later). The information, which indicates whether the registered monitoring range is currently valid or invalid, is managed by the monitoring range managing unit 360 in the monitoring range managing processing (FIG. 12) that will be described later.

In step S70, the position registration unit 310 determines whether or not to end the registration. Specifically, when the user pushes the ending button BT2, the position registration unit 310 determines that the registration is to be ended (step S70: YES) and ends the position registration processing. When the user does not push the ending button BT2, the position registration unit 310 determines that the registration is not to be ended (step S70: NO), returns to step S20 and repeats the processing.

FIG. 8 shows an example of the monitoring range of a first illustrative embodiment. In FIG. 8, three monitoring ranges associated with one target printer (the printer 200) are shown. A monitoring range A1 is a range having a position P1 as a center and a monitoring distance D1 as a radius. A monitoring range A2 is a range having a position P2 as a center and a monitoring distance D2 as a radius. A monitoring range A3 is a range having a position P3 as a center and a monitoring distance D3 as a radius. Here, the position P1 is set as the position of the printer 200 and the monitoring distance D1 is set to be about 3 to 10 meters. In the first illustrative embodiment, a range close to the printer 200, within which the user can easily step at the printer 200 so as to collect the printed document, such as the monitoring range A1, is referred to as a first-type range. The center positions P2, P3 of the two monitoring ranges A2, A3 are located at doors of a room RM (for example, an office room) in which the printer 200 is installed. The two monitoring ranges A2, A3 are set as ranges through which persons going in and out of the room RM through the doors pass. Like the two monitoring ranges A2, A3, a range more distant from the printer 200 than the monitoring range A1, i.e., a range having a position different from the installation position of the printer 200 as a center is referred to as a second-type range.

As shown in FIG. 7, in the monitoring range registration table AT, the information indicative of the type of the monitoring range, i.e., the type information, which indicates whether the monitoring range is the first-type range or second-type range, is associated with each monitoring range. Specifically, in step S40, when the bt1 is pushed, i.e., when the registration operation of the monitoring range is received, if the check box CB (FIG. 6) is checked, the type information indicative of the first-type range is associated. Also, when the registration operation of the monitoring range is received, if the check box CB is not checked, the type information indicative of the second-type range is associated. Instead of this configuration, the type information may be input by the user after the monitoring range registration. Alternatively, the monitoring range based on the position first registered may be used as the first-type range and the monitoring range based on the position registered after the second may be used as the second-type range. In this case, when receiving the first registration operation of the monitoring range, the position registration unit 310 may display a message, which urges the user to push the registration button BT1 at the installation place of the target printer, on the display unit 470.

Here, the message table MT (FIG. 1) is described. FIG. 9 shows an example of the message table MT of the first illustrative embodiment. As described above, a message corresponding to the status of the printer 200 and the monitoring range is recorded in the message table MT. The message table MT is prepared on the assumption that the printing job is transmitted to the printer 200 from the user in the room RM (FIG. 8) in which the printer 200 is installed. In the first-type range close to the printer 200, messages, which should be notified depending on the status of the printer 200 when the user is close to the printer 200, are associated. That is, in the first-type range, a message for notifying that the printer 200 is close to the user and a message for describing the status of the printer 200 (specifically, the progressing status (FIG. 2) of the printing job) are associated.

Specifically, for example, the execution standby status ST2 is associated with a message describing that the printing processing based on the printing job does not start and considerable time is required until the printing processing is completed. Also, the execution start operation standby status ST3 is associated with an operation request message urging the user to operate the operation unit 260 for starting the printing processing. Also, the status under image development ST41 is associated with a message describing that relatively long time is required until the printing processing is completed. The status under output ST42 is associated with a message describing that relatively short time is required until the printing processing is completed and urging the user to collect the printed document.

Also, the status under suspension ST43 is associated with a measure request message urging the user to take a measure for the printer 200 (a measure solving the cause for suspension), depending on the cause for suspension. In FIG. 9, an example where the cause for suspension is 'paper jam' is shown. Also, the ending status STE is associated with different messages, depending on causes for shift to the ending status STE, respectively. For example, a status where the printer 200 shifts to the ending status STE due to the non-recoverable hindrance is associated with a message urging the user to confirm a cause for the hindrance. A status where the printer 200 shifts to the ending status STE due to the normal ending is associated with a message urging the user to collect the printed document. A status where the printer 200 shifts to the ending status STE due to the cancellation is associated with a message urging the user to confirm the cancelled printing job.

Also, in the second-type range, messages, which should be notified depending on the status of the printer 200 when the user passes through the door so as to go out of the room RM, are associated. For example, the statuses ST3, ST41, ST43 and the ending status STE other than the normal ending are associated with the same messages as those of the first-type range. Compared to this, the statuses ST2, ST42 and the ending status STE due to the normal ending are associated with messages different from those of the first-type range. Specifically, a message more strongly urging the user to collect the printed document than the message associated with the first-type range is associated.

The reason is because the printed document may be left non-collected at the printer 200 for a relatively long time if the user goes out of the room RM. The non-collected printed document is not preferable from a standpoint of the security because it may be seen by a third party. For this reason, in this illustrative embodiment, the message associated with the second-type range is prepared so that the message strongly urging the user to collect the printed document is transmitted at timing at which the user goes out of the room RM.

A-4: Overall Operations of System

Figure 10:
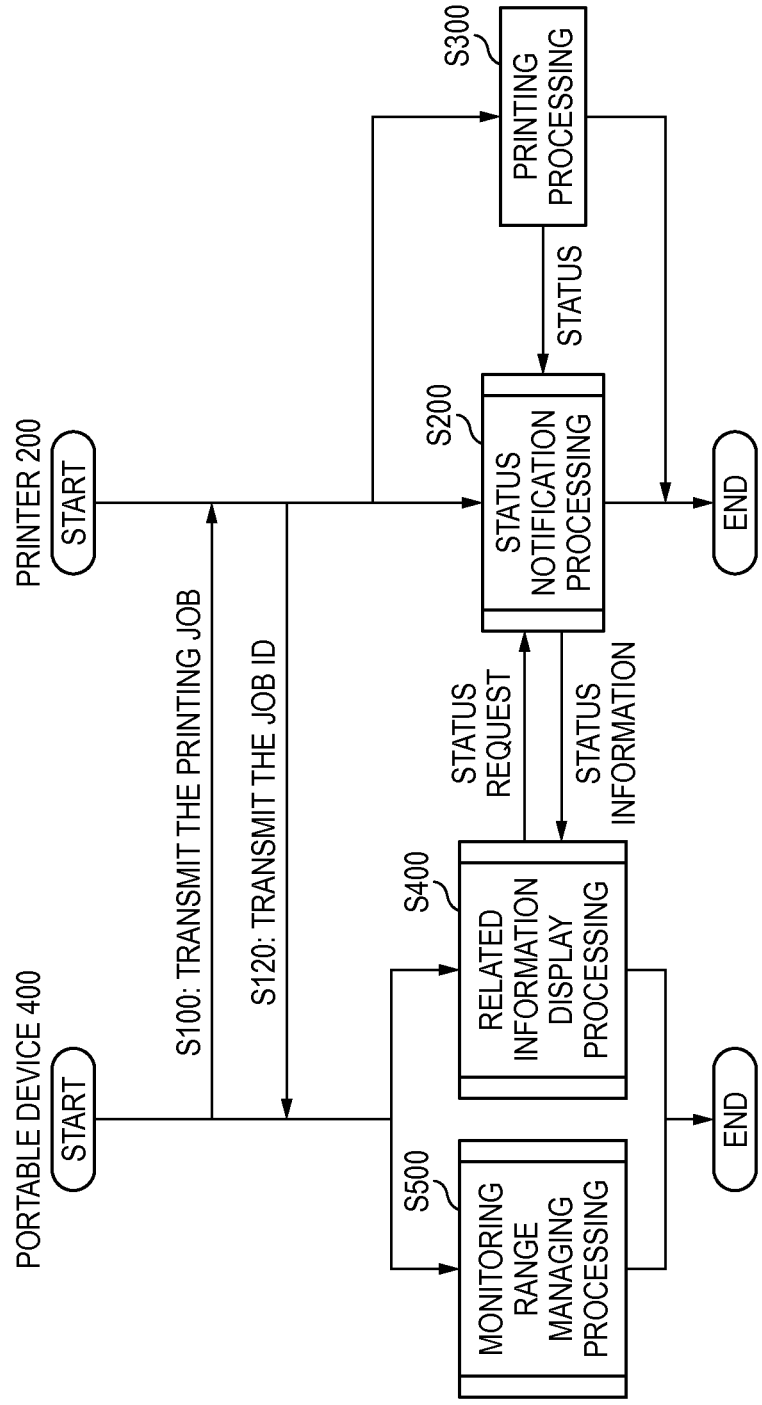
FIG. 10 is a first sequence diagram showing an outline of operations of the printing system.
Figure 11:
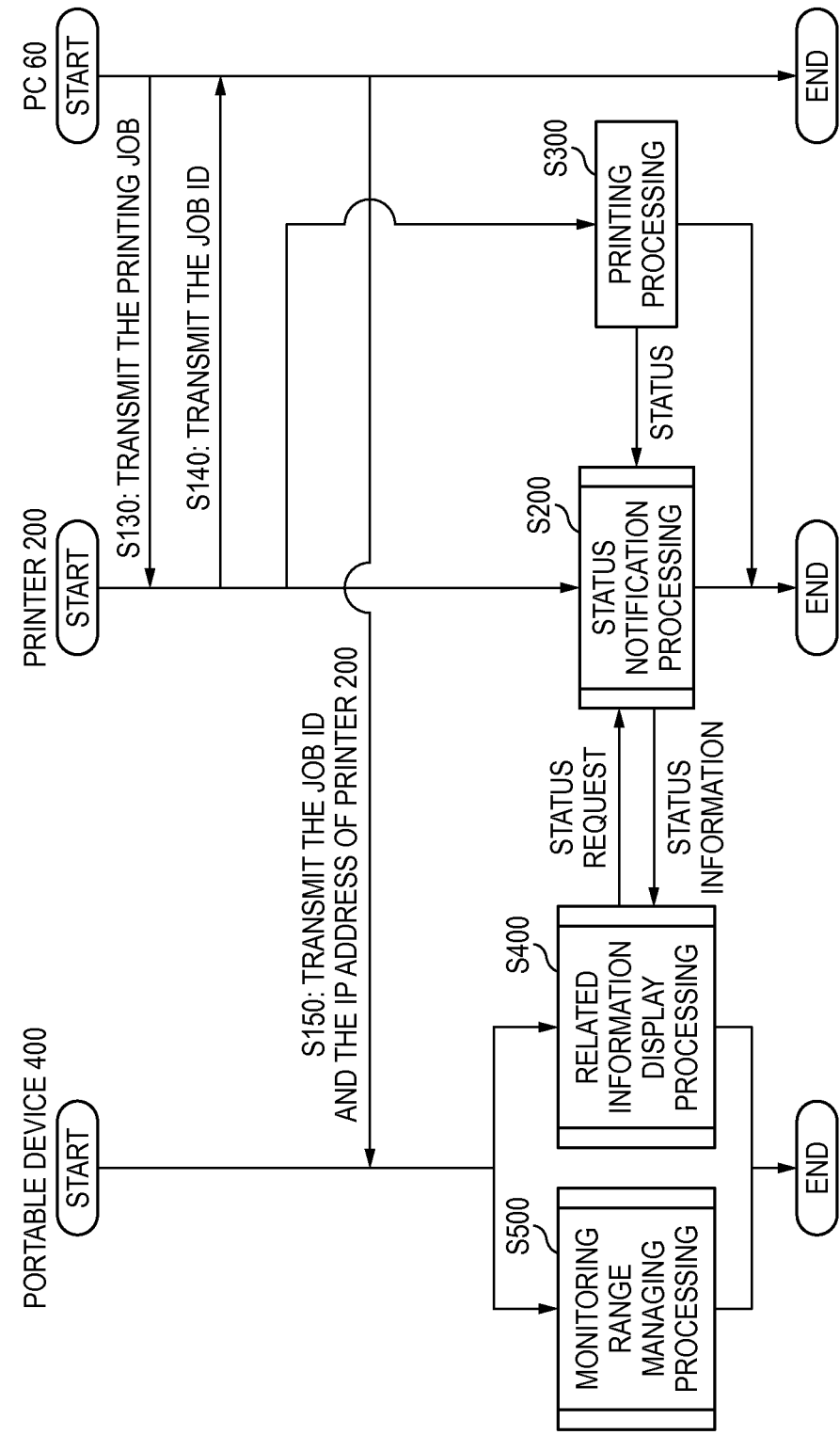
FIG. 11 is a second sequence diagram showing the outline of the operations of the printing system.

Subsequently, the overall operations of the printing system shown in FIG. 1 will be described. FIGS. 10 and 11 are sequence diagrams showing an outline of the operations of the printing system. The printing system can operate in accordance with two patterns of a pattern A shown in FIG. 10 and a pattern B shown in FIG. 11.

A-4-1: Pattern A

In the pattern A shown in FIG. 10, the printing job is first transmitted from the portable device 400 to the printer 200 (step S100). For example, the user of the portable device 400 operates the printer driver 300 of the portable device 400 to designate predetermined image data and to issue a printing instruction. The printing job transmission unit 320 of the printer driver 300 generates a printing job including the designated image data and a printing command (including commands of designating the sheet size, the number of sheets to be printed and the like). Then, the printing job transmission unit 320 transmits the printing job to the printer 200 through the wireless LAN.

When the printer 200 receives the printing job, the identification information transmission unit 140 of the printer 200 generates a job ID, which is the identification information for identifying the printing job, and transmits the generated job ID to the portable device 400, which is the transmission source of the printing job (step S120). The printer driver 300 of the portable device 400 stores the received job ID in a predetermined area of the non-volatile storage device 420 or volatile storage device 425.

Subsequently, the printer 200 executes status notification processing (step S200) and the printing processing (step S300) in parallel. Specifically, when the job reception unit 110 (FIG. 1) of the communication control unit 100 receives the printing job, the communication control unit 100 starts the status notification processing. Also, the printing control unit 30 receives the received printing job and starts the printing processing (FIG. 2) based on the printing job. The status notification processing is processing of transmitting the status information indicative of the status of the printer 200, specifically the progressing status (FIG. 2) of the printing processing to the portable device 400, as a response to a status notification request from the portable device 400.

When the printer driver 300 of the portable device 400 receives the job ID, the printer driver executes monitoring range managing processing (step S500) and related information display processing (step S400) in parallel. The monitoring range managing processing and the related information display processing will be specifically described later.

A-4-2: Pattern B

In the pattern B shown in FIG. 11, the printing job is first transmitted from the printer driver 65 of the PC 60 to the printer 200 (step S130). When the printer 200 (the job reception unit 110 of the communication control unit 100) receives the printing job, the identification information transmission unit 140 (FIG. 1) of the communication control unit 100 transmits the job ID to the PC 60 that is the transmission source of the printing job (step S140). After that, the printer 200 executes the status notification processing (step S200) and the printing processing (step S300) in parallel, like the pattern A of FIG. 10.

When the printer driver 65 of the PC 60 receives the job IP, the printer driver 65 transmits the job ID and an IP address of the printer 200 to the portable device 400 (step S150). For example, the portable device 400 that is a transmission destination is designated by the PC 60. For instance, when the printer driver 65 receives a transmission instruction of the printing job, the printer driver 65 displays a predetermined UI screen (not shown) and receives an input of an IP address of the portable device 400 from the user. The printer driver 65 sets the input IP address of the portable device 400 as a transmission destination and transmits the job ID and the IP address of the printer 200 thereto. Alternatively, the printer driver 65 may directly present information, which includes the job ID and the IP address of the printer 200, to the user.

Specifically, the printer driver 65 may display a URL (Uniform Resource Locator) having the job ID and the IP address of the printer 200 inserted therein on a display apparatus of the printer 200. Also, for example, when the portable device 400 and the printer 200 can perform communication by using the short-distance wireless communication (Bluetooth (the registered trademark), infrared communication and the like) having a relatively short communication distance, the URL may be transmitted to the portable device 400 by using the communication means.

When the printer driver 300 of the portable device 400 receives the job ID and the IP address of the printer 200, the printer driver 300 executes the monitoring range managing processing (step S500) and the related information display processing (step S400) in parallel, like the pattern A shown in FIG. 10. In the meantime, the processing may be executed after an instruction to display a message corresponding to a progressing status of the printing job is received from the user. For example, when the printer driver 300 receives the job ID and the IP address of the printer 200, the printer driver 300 may display a predetermined UI image (not shown) on the display unit 470 and receive an instruction to display a message.

In the meantime, the monitoring range managing processing and the related information display processing, which are executed by the printer driver 300 of the portable device 400, and the status notification processing that is executed in the printer 200 are basically the same processing in the pattern A and the pattern B. In the below, the processing is further described.

A-4-3: Monitoring Range Managing Processing

Figure 12:
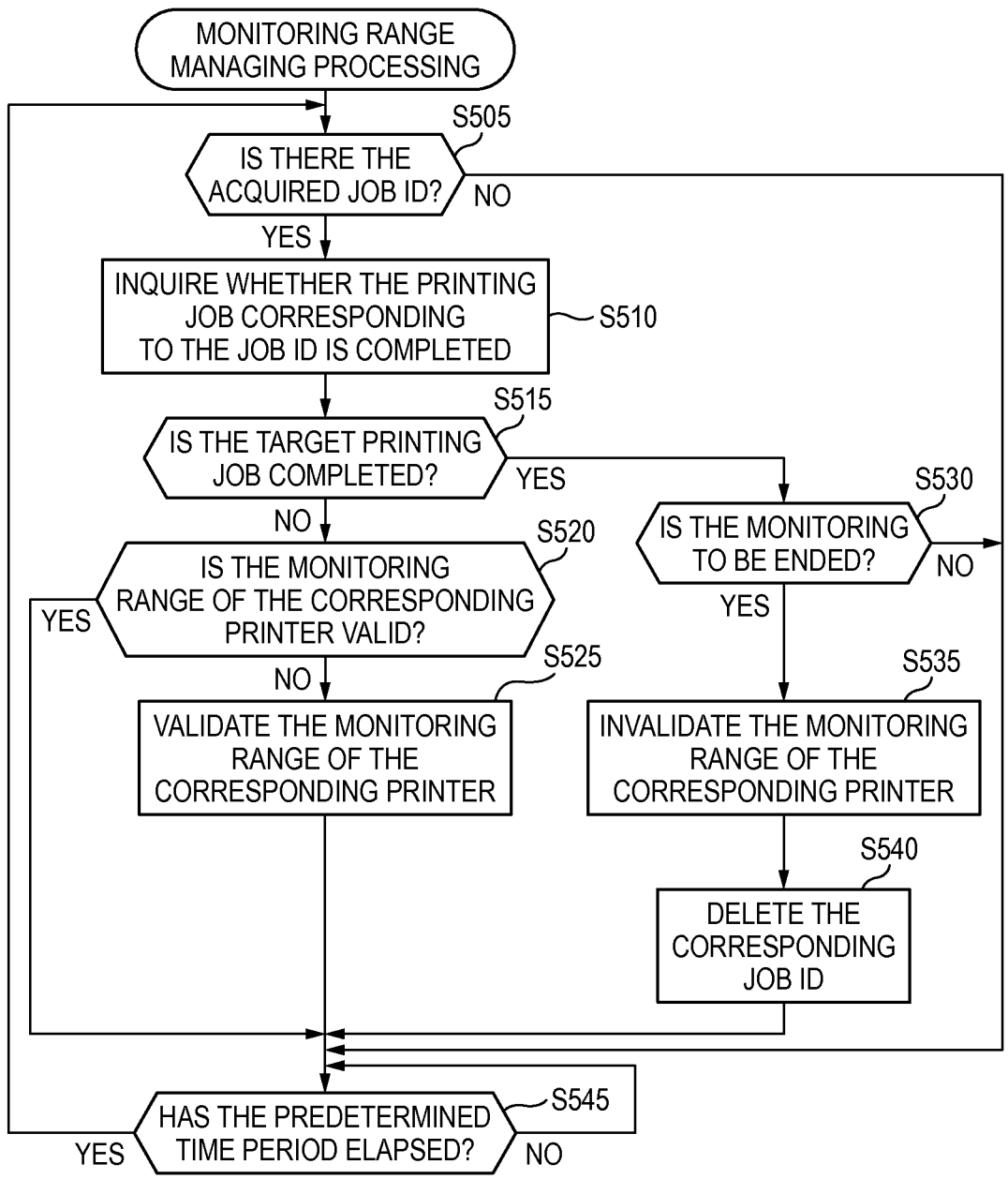
FIG. 12 is a flow chart of monitoring range managing processing.

FIG. 12 is a flow chart of the monitoring range managing processing. The monitoring range managing processing is processing that is executed by the monitoring range managing unit 360 of the printer driver 300. The monitoring range managing processing is processing of validating and invalidating the plurality of monitoring ranges (FIGS. 7 and 8) registered in the monitoring range registration table AT.

When the monitoring range managing processing starts, in step S505, the monitoring range managing unit 360 determines whether there is the job ID acquired in step S120 of FIG. 10 or step S140 of FIG. 11. When the job ID is stored in the predetermined area of the non-volatile storage device 420 or volatile storage device 425, the monitoring range managing unit 360 determines that there is the acquired job ID. When the acquired job ID is not stored (step S505: NO), the monitoring range managing unit 360 proceeds to step S545.

When the acquired job ID is stored (step S505: YES), the monitoring range managing unit 360 inquires of the printer 200 whether the printing based on the printing job (hereinafter, referred to as the target printing job) corresponding to the acquired job ID is completed, by using the IP address of the printer 200 acquired together with the acquired job ID. The communication control unit 100 of the printer 200 transmits information, which indicates that the printing based on the target printing job is completed or that the printing based on the target printing job is not completed, to the portable device 400, as a response to the inquiry.

In step S515, the monitoring range managing unit 360 determines whether the target printing job is completed, based on the response from the printer 200. When the target printing job is not completed (step S515: NO), the monitoring range managing unit 360 determines whether the monitoring range of the printer 200 (hereinafter, referred to as the corresponding printer) processing the target printing job is valid (step S520). As described above, the validity of the monitoring range is recorded in the monitoring range registration table AT (FIG. 7). As shown in FIG. 7, the validity/invalidity of the monitoring range is managed for each printer. In the example of FIG. 7, the validity/invalidity of the three monitoring ranges of one printer 200 (MFP-XXXXXX) is managed by one flag.

When the monitoring range of the corresponding printer 200 is valid (step S520: YES), the monitoring range managing unit 360 proceeds to step S545. Thus, in this case, the monitoring range of the corresponding printer 200 is effectively maintained. When the monitoring range of the corresponding printer 200 is invalid (step S520: NO), the monitoring range managing unit 360 validates the monitoring range of the corresponding printer 200 (step S525) and proceeds to step S545. For example, in the example of FIG. 7, when the corresponding printer 200 is 'MFP-XXXXXX', the three monitoring ranges of 'MFP-XXXXXX' are valid. For example, when the processing of step S520 is first executed after the printing job is received (step S120 of FIG. 10 or S150 of FIG. 11), the monitoring range of the printer 200 corresponding to the printing job is not valid. Hence, in this case, it is determined that the monitoring range of the corresponding printer 200 is invalid (step S520: NO), so that the monitoring range managing unit 360 validates the monitoring range of the corresponding printer 200 (step S525).

In step S515, when the target printing job is completed (step S515: YES), the monitoring range managing unit 360 determines whether or not to end the monitoring of the target printing job (step S530). Here, when the target printing job is completed, the reason to determine whether or not to end the monitoring of the target printing job without immediately invalidating the monitoring range is described. Even when the target printing job is completed, if the printed document is not collected yet and is still left at the printer 200, it is preferable to notify the message (FIG. 9) urging the user to collect the printed document. Like this, there is a situation where the monitoring of the target printing job should not be ended even when the target printing job is completed.

When the printer 200 has a sheet sensor that can determine whether the printed sheet is on a sheet discharge tray, for example, the monitoring range managing unit 360 inquires of the printer 200 whether the printed sheet remains. When the printed sheet remains at the printer 200, the monitoring range managing unit 360 determines that the monitoring of the target printing job is not to be ended. When the printed sheet does not remain at the printer 200, the monitoring range managing unit 360 determines that the monitoring of the target printing job is to be ended.

When the monitoring of the target printing job is not to be ended (step S530: NO), the monitoring range managing unit 360 proceeds to step S545. When the monitoring of the target printing job is to be ended (step S530: YES), the monitoring range managing unit 360 invalidates the monitoring range of the corresponding printer 200 (step S535). Then, the monitoring range managing unit 360 deletes the job ID corresponding to the target printing job from the non-volatile storage device 420 or volatile storage device 425 (step S540) and proceeds to step S545.

In step S545, the monitoring range managing unit 360 determines whether a predetermined time period has elapsed. When the predetermined time period has not elapsed (step S545: NO), the monitoring range managing unit 360 stands by until the predetermined time period elapses. When the predetermined time period has elapsed (step S545: YES), the monitoring range managing unit 360 returns to step S505 and repeats the processing of steps S510 to S540.

Incidentally, although the processing of the one job ID has been described in the above, a plurality of job IDs may be acquired. In this case, the above-described processing is executed for a plurality of target printing jobs corresponding to the job IDs, respectively. Hence, a plurality of monitoring ranges corresponding to the plurality of printers 200 may be validated at the same time.

By the above-described monitoring range managing processing, it is possible to appropriately manage the validity/invalidity of the monitoring range that is used in the related information display processing, which will be described below. As can be seen from the above descriptions, the monitoring range of the printer 200 processing the printing job, which is the monitoring target, is controlled to be valid after the printing job of the monitoring target is received at the printer 200 until the printed document based on the printing job of the monitoring target is collected by the user.

A-4-4: Related Information Display Processing

Figure 13:
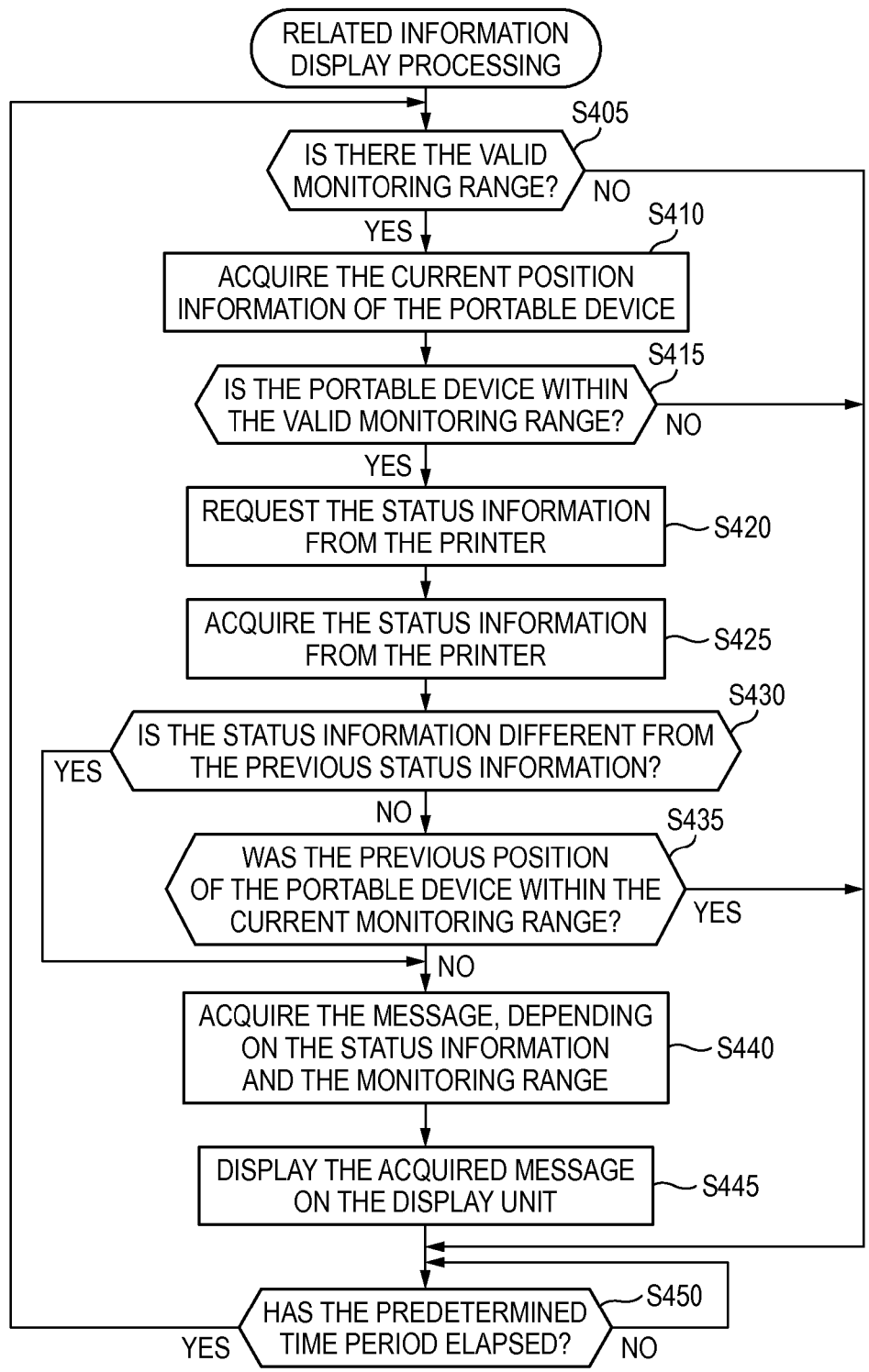
FIG. 13 is a flow chart of related information display processing.

FIG. 13 is a flow chart of the related information display processing. The related information display processing is processing that is executed by the printer driver 300 (mainly, the terminal position acquisition unit 330, the related information acquisition unit 340 and the output processing unit 350). The related information display processing is processing of displaying the information relating to the current status of the printer 200, specifically, the message (FIG. 9) recorded in the message table MT on the display unit 470, based on the monitoring range made to be valid in the monitoring range managing processing and the current position information acquired using the GPS unit 480.

When the related information display processing starts, the printer driver 300 determines whether there is the monitoring range made to be valid in the monitoring range managing processing by referring to the monitoring range registration table AT (FIG. 7), in step S405. When there is no valid monitoring range (step S405: NO), the printer driver 300 proceeds to step S450. When there is the valid monitoring range (step S405: YES), the terminal position acquisition unit 330 acquires the current position information, which indicates the current position of the portable device 400, by using the GPS unit 480 (step S410).

In step S415, the related information acquisition unit 340 determines whether the portable device 400 exists in the valid monitoring range, based on the current position information acquired in step S410 and the range defining information recorded in the monitoring range registration table AT (FIG. 7). Specifically, the related information acquisition unit 340 calculates a distance RS between the position of the portable device 400 indicated by the current position information and the center position of the monitoring range indicated by the range defining information. Then, the related information acquisition unit 340 compares the distance RS and the monitoring distance (a radius from the center position) of the monitoring range indicated by the range defining information. When the distance RS is larger than the monitoring distance, the related information acquisition unit 340 determines that the portable device 400 does not exist in the monitoring range, and when the distance RS is the monitoring distance or smaller, the related information acquisition unit 340 determines that the portable device 400 exists in the monitoring range.

When the portable device 400 does not exist in the valid monitoring range (step S415: NO), the related information acquisition unit 340 proceeds to step S450. When the portable device 400 exists in the valid monitoring range (step S415: YES), the related information acquisition unit 340 requests the status information from the printer 200 corresponding to the valid monitoring range within which the portable device 400 exists (step S420). Specifically, the related information acquisition unit 340 transmits a status notification request, which includes the job ID of the printing job being processed in the printer 200 of a request destination, to the printer 200 of the request destination.

When the notification request reception unit 150 of the printer 200 receives the status notification request from the portable device 400, the status specifying unit 120 of the printer 200 specifies the status (FIG. 2) of the printing job corresponding to the job ID included in the status notification request by referring to the status information 222. Then, the status information transmission unit 130 of the printer 200 transmits the status information, which indicates the specified status of the printing job, to the printer 200, as a response to the status notification request.

In step S425, the related information acquisition unit 340 acquires the status information transmitted from the printer 200. As can be seen from step S450, which will be described below, in step S430, the related information acquisition unit 340 determines whether the acquired status information is different from previous time-acquired status information, which is acquired in step S425 of one previous time of last-minute step S425 of a plurality of steps S425 being executed in the related information display processing. The previous time-acquired status information is recorded in a predetermined storage area of the volatile storage device 425, for example.

When the status information acquired in step S425 is the same as the previous time-acquired status information (step S430: NO), the related information acquisition unit 340 determines whether a previous position of the portable device 400 is within the monitoring range within which the portable device 400 currently exists (step S435). The previous position of the portable device 400 is a position that is indicated by the current position information acquired in step S410 of one previous time of last-minute step S410 and is recorded in a predetermined storage area of the volatile storage device 425, for example. The related information acquisition unit 340 determines whether the previous position of the portable device 400 is within the monitoring range, by using the same method as that described in step S415.

When the previous position of the portable device 400 is beyond the monitoring range (step S435: NO), the related information acquisition unit 340 acquires a message to be displayed in accordance with the status information acquired in step S425 and the monitoring range within which the portable device 400 exists (step S440). The message to be displayed is acquired from the message table MT (FIG. 9) that is stored in the non-volatile storage device 420. For example, when the status information acquired in step S425 indicates the status under output ST42 and the monitoring range within which the portable device 400 exists is the first-type range (specifically, the monitoring range A1 (FIG. 8)), a message indicating that the time required to complete the printing is relatively short and urging the user to collect the printed document is acquired as the message to be displayed. Also, when the status information indicates the status under output ST42 and the monitoring range within which the portable device 400 exists is the second-type range (specifically, the monitoring range A2 or A3 (FIG. 8)), the message more strongly urging the user to collect the printed document is acquired as the message to be displayed, compared to the first-type range that is the monitoring range within which the portable device 400 exists.

Figure 14:
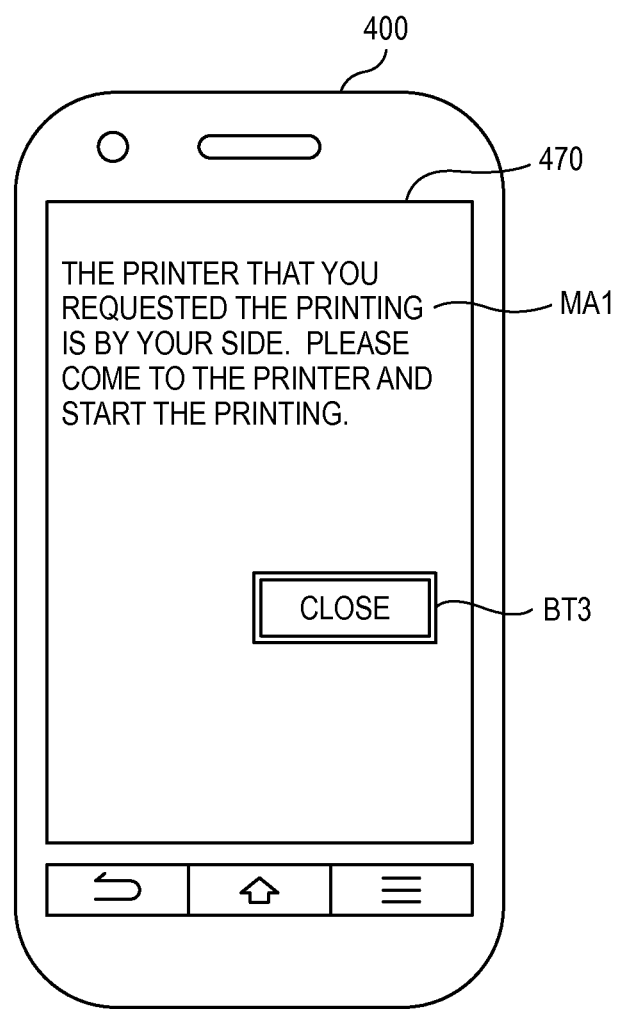
FIG. 14 shows a displayed pattern of a message on a display unit of a portable device.

In step S445, the output processing unit 350 displays the message acquired in step S440 on the display unit 470. FIG. 14 shows a displayed pattern of a message MA (in this example, the operation request message corresponding to the execution start operation standby status ST3) on the display unit 470 of the portable device 400. The message is displayed together with generation of a notifying sound or a vibration operation and the user can recognize that the message is displayed. When the user touches a button BT3, which instructs an ending of the display, the output processing unit 350 ends the display of the message.

As can be seen from the above descriptions, when the current position of the portable device 400 is within the valid monitoring range (step S415: YES) and the previous position is beyond the monitoring range (step S435: NO), the message corresponding to the status information and the monitoring range is displayed on the display unit 470 of the portable device 400. In other words, in steps S415 and S435, it is determined whether the portable device 400 is moved from the outside of the valid monitoring range to the inside of the valid monitoring range. When it is determined that the portable device 400 is moved from the outside of the valid monitoring range to the inside of the valid monitoring range, the message corresponding to the status information and the monitoring range is displayed on the display unit 470 of the portable device 400.

When the status information acquired in step S425 is different from the previous time-acquired status information (step S430: YES), the processing of step S435 is skipped over and the processing of steps S440 and S445 is executed. That is, the related information acquisition unit 340 acquires the message to be displayed (step S440) and the output processing unit 350 displays the acquired message on the display unit 470. That is, when the current position of the portable device 400 is within the valid monitoring range (step S415: YES) and the status information is different from the previous time-acquired status information (step S430: YES), the message is displayed on the display unit 470 of the portable device 400. In other words, when the progressing status of the printing processing is changed and the acquired status information is thus changed at the state where the portable device 400 is within the valid monitoring range, the message is displayed on the display unit 470 of the portable device 400, irrespective of the previous position of the portable device 400.

In step S450, the printer driver 300 determines whether a predetermined time period has elapsed. When the predetermined time period has not elapsed (step S450: NO), the printer driver 300 stands by until the predetermined time period has elapsed. When the predetermined time period has elapsed (step S450: YES), the printer driver 300 returns to step S405. As a result, the processing of steps S405 to S445 is periodically repeated. That is, the current position information of the portable device 400 is periodically (for example, at an interval of few seconds), so that when a message display condition is satisfied, the message is displayed on the display unit 470 of the portable device 400. As described above, the message display condition is any one of (1) a condition that the portable device 400 is moved from the outside of the valid monitoring range to the inside of the valid monitoring range and (2) a condition that the portable device 400 is within the valid monitoring range and the status information (i.e., the progressing status of the printing processing) is changed.

As can be seen from the condition (1), when the portable device 400 is moved from the outside of the valid monitoring range to the inside of the valid monitoring range, the message is displayed even though the status information is not changed. As a result, for example, even when the output of the printed document is completed and the status information is not changed, the user can receive the message urging the collection of the printed document whenever the user moves from the outside of the valid monitoring range to the inside of the valid monitoring range.

As can be seen from the condition (2), when the status information is changed and the message to be displayed is thus changed even though the user stays in the monitoring range for a relatively long time, the message corresponding to the status information is transmitted to the display unit 470 of the portable device 400, so that the user can appropriately recognize the progressing status of the printing processing.

According to the above-described illustrative embodiment, when the portable device 400 is within the monitoring range such as the monitoring range A1 defined on the basis of the position P1 and the monitoring range A2 defined on the basis of the position P2, the message, which is the related information corresponding to the current status of the printer 200, is displayed on the display unit 470 of the portable device 400. Therefore, the user can acquire the appropriate information (specifically, the message corresponding to the current status of the printer 200) relating to the printer 200 at an appropriate position through the portable device 400 by registering the information indicative of the appropriate positions P1, P2 with the portable device 400. Hence, it is possible to improve the convenience for the user to the printer 200 by using the portable device 400. Specifically, for example, the user can determine a measure that should be adopted so as to collect the printed document, in accordance with the acquired message.

Also, the monitoring range includes the monitoring range A1 defined on the basis of the position P1 and the monitoring ranges A2, A3 defined on the basis of the positions P2, P3 (FIG. 8). In step S440 of FIG. 13, when the current position of the portable device 400 is within the monitoring range A1, which is the first-type range, the related information acquisition unit 340 acquires a first message, and when the current position of the portable device 400 is within the monitoring range A2 or A3, which is the second-type range, the related information acquisition unit 340 acquires a second message different from the first message. As a specific example, a case where the status of the printer 200 is the execution standby status ST2 is described. In this case, as shown in FIG. 9, when the current position of the portable device 400 is within the monitoring range A1, the related information acquisition unit 340 acquires a message indicating that the considerable time is required to complete the printing processing. Also, when the current position of the portable device 400 is within the monitoring range A2 or A3, the related information acquisition unit 340 acquires a message indicating that the considerable time is required to complete the printing processing and bringing attention to the collection of the printed document.

As a result, when the position of the portable device 400 is within the monitoring range A1 or within the monitoring ranges A2, A3, the different messages are displayed on the display unit 470. Thus, the user can acquire the appropriate message depending on the position of the portable device 400, i.e., the position of the user, which is convenient to the user. More specifically, in this illustrative embodiment, when the user is within the monitoring range A1 including the printer 200, i.e., when the user is at a position relatively close to the printer 200, a message notifying a status of the printing job is displayed on the display unit 470. When the user is within the monitoring range A2 or A3 set at the door of the room RM, i.e., when the user intends to go in and out of the room RM, a message notifying a status of the printing job and strongly urging the user to collect the printed document is displayed on the display unit 470. As a result, when the user having transmitted the printing job to the printer 200 in the room RM intends to go out of the room RM without approaching the printer 200, it is possible to urge the user to collect the printed document. Also, even when the user approaches the printer 200 but forgets to collect the printed document even though the message is displayed on the display unit 470, it is possible to urge the user to collect the printed document when the user intends to go out of the room RM thereafter.

Also, as described above, as can be seen from the example (FIG. 9) where the current status of the printer 200 is the specific status (for example, the execution standby status ST2 or status under output ST42), even when the current status of the printer 200 is the same, if the monitoring range within which the portable device 400 exists is different, different information may be displayed on the display unit 470. As a result, the user can acquire a more pertinent message, depending on the position of the user.

Also, in the position registration processing (FIG. 5), the position registration unit 310 executes reception processing (step S40 in FIG. 5) of receiving a specific operation (specifically, the pushing operation of the registration button BT1 (FIG. 6)) on the portable device 400 for registering the positions P1, P2 from the user. When the specific operation is received from the user, the position registration unit 310 registers the position at which the portable device 400 exists as a position for defining the monitoring range (for example, the monitoring ranges A1, A2, A3) (step S60 in FIG. 5). As a result, the user can easily register the position for defining the monitoring range by using the portable device 400. For example, the position registration unit 310 can relatively freely register the monitoring range at the position at which the printer 200 exists or a position (specifically, the door of the room RM, and the like) different from the position at which the printer 200 exists. Also, the position registration unit 310 can easily register a plurality of monitoring ranges.

Also, the position registration unit 310 associates and registers the information (the coordinate information) indicating the position and the identification information for identifying the target printer in the monitoring range registration table AT (FIG. 5: step S60). As a result, the position registration unit 310 can register the positions for defining one or more monitoring ranges for each printer. Hence, even when the printing job can be transmitted to the printers, respectively, the portable device 400 can display an appropriate message on the display unit 470 at an appropriate position for each printer.

Also, as can be seen from FIG. 8, a position in the monitoring range A1 and a position in the monitoring range A2 are objectively different as regards the distance from the position P1 (the position of the printer 200). As described above, when the printer 200 is within the monitoring range A1 or within the monitoring range A2, the different messages may be displayed on the display unit 470. That is, when the distance between the position P1 and the portable device 400 is a first distance, the related information acquisition unit 340 may acquire the first message, and when the distance between the position P1 and the portable device 400 is a second distance different from the first distance, the related information acquisition unit 340 may acquire the second message different from the first message. Hence, the portable device 400 can display an appropriate message on the display unit 470, depending on the distance between the printer 200 and the portable device 400, which is convenient to the user.

Also, the printer 200 just transmits the status information to the portable device 400, pursuant to the transmission request from the portable device 400. As a result, it is possible to suppress the excessive processing burden on the printer 200.

B. Second Illustrative Embodiment

A second illustrative embodiment is different from the first illustrative embodiment, as regards the monitoring range to be assumed and the contents of the message table. In the second illustrative embodiment, the apparatus configuration and operations of the network system are basically the same as the apparatus configuration (FIG. 1) and operations (FIGS. 2 to 7 and FIGS. 7 to 14) of the network system of the first illustrative embodiment.

Figure 15:
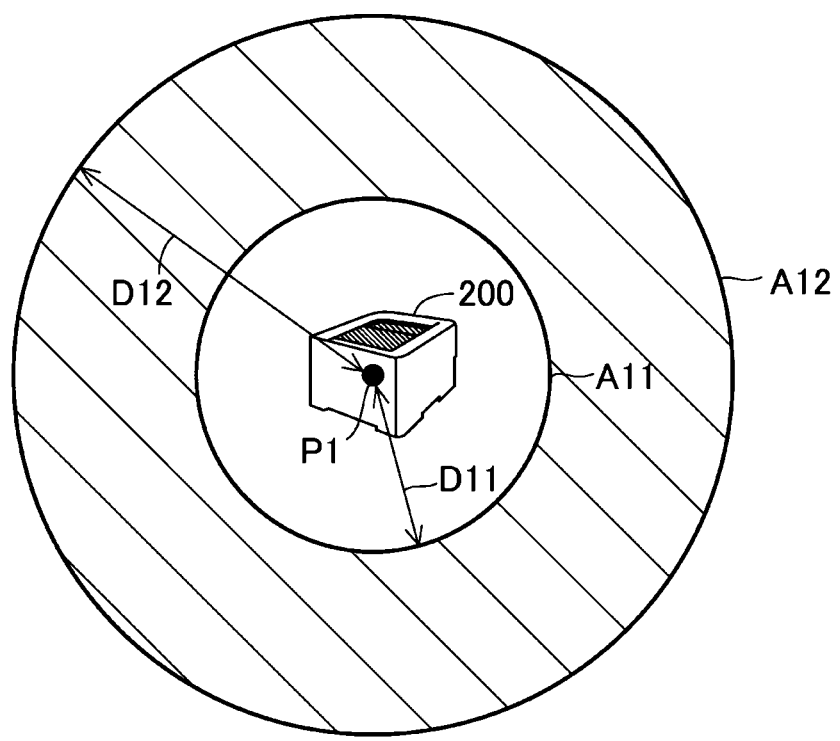
FIG. 15 shows an example of the monitoring range of a second illustrative embodiment.

FIG. 15 shows an example of the monitoring range of the second illustrative embodiment. FIG. 15 shows two monitoring ranges associated with one target printer (the printer 200). A monitoring range A11 has a position P1 (the installation position of the printer 200) as a center and a monitoring distance D11 as a radius. A monitoring range A12 has the position P1 as a center and a monitoring distance D12 (D12>D11) as a radius and is a range (a hatched part in FIG. 15) beyond the monitoring range A11. In other words, the monitoring range A12 is a range having a distance to the position P1 larger than the monitoring distance D11 and equal to or smaller than the monitoring distance D12. For example, the monitoring distance D11 is set to be about 3 to 10 meters. For example, the monitoring distance D12 is set to be about 10 to 30 meters. That is, the monitoring range A11 and the monitoring range A12 are defined on the basis of the common position P1.

Like the monitoring range A1 of the first illustrative embodiment, the monitoring range A11 is a range close to the printer 200 so that the user can easily step at the printer 200 so as to collect the printed document, for example. In the second illustrative embodiment, the monitoring range A11 is set as the first-type range. The monitoring range A12 is a range within which the user wants to receive a message relating to the status (the progressing status of the printing job) of the printer 200. The monitoring range A12 may be set to cover the entire room in which the printer 200 is installed or the entire building (the office building and the like) in which the printer 200 is arranged, for example. In the second illustrative embodiment, the monitoring range A12 is set as the second-type range.

FIG. 16 shows an example of a message table MT2 of the second illustrative embodiment. In the message table MT2, messages corresponding to the statuses of the printer 200 and the monitoring ranges are recorded, like the message table MT (FIG. 9) of the first illustrative embodiment. In the message table MT2, the first-type range and the second-type range are associated with messages describing the statuses (specifically, the progressing statuses of the printing job) of the printer 200, like the message table MT of the first illustrative embodiment.

The messages associated with the second-type range basically do not include a message for guiding the user to the printer 200, unlike the messages associated with the first-type range. That is, the messages associated with the first-type range may include a message urging the user to collect the printed document and a message urging the user to solve an error (paper jam and the like), together with the description of the progressing status of the printing job. Compared to this, the messages associated with the second-type range basically include the description of the progressing status of the printing job and do not include a message urging the user to collect the printed document and a message urging the user to solve an error (paper jam and the like).

According to the above-described second illustrative embodiment, the monitoring range A11 is a range having the distance to the position P1 within a first reference value (the monitoring distance D11) and the monitoring range A12 is a range having the distance to the position P1 within a second reference value (the monitoring distance D12) larger than the first reference value. In other words, when the distance between the position P1 and the portable device 400 is the first distance (specifically, the distance equal to or smaller than the monitoring distance D11), the related information acquisition unit 340 may acquire the first message, and when the distance between the position P1 and the portable device 400 is the second distance (specifically, the distance larger than the monitoring distance D11 and equal to or smaller than the monitoring distance D12) different from the first distance, the related information acquisition unit 340 may acquire the second message different from the first message. As a result, the different messages may be displayed on the display unit 470, depending on the distance from the position P1 to the terminal apparatus. Hence, the user can acquire a more pertinent message, depending on the distance from the position P1.

Specifically, when the user is at a position relatively distant from the printer 200, the user can acquire a message including the description of the progressing status of the printing job and thus appropriately recognize the progressing status of the printing job. When the user is at a position relatively close to the printer 200, the user can appropriately acquire the message urging the user to collect the printed document or the message urging the user to solve an error, in addition to the description of the progressing status of the printing job. As a result, the user can appropriately determine a measure that should be adopted, in accordance with the acquired message.

C. Third Illustrative Embodiment

In the first and second illustrative embodiments, the printer driver 300 of the portable device 400 determines whether the position of the portable device 400 is within the valid monitoring range and determines the message to be displayed. Instead of this configuration, in a third illustrative embodiment, an example where the communication control unit 100 of the printer 200 determines whether the position of the portable device 400 is within the valid monitoring range and determines the message to be displayed is described. To this end, the message tables MT, MT2 that are stored in the non-volatile storage device 420 of the portable device 400 in the first and second illustrative embodiments are stored in the non-volatile storage device 220 of the printer 200, in the third illustrative embodiment.

The printer driver 300 of the portable device 400 transmits the range defining information registered in the monitoring range registration table AT to the printer 200. For example, when transmitting the printing job to the printer 200, the printer driver 300 transmits the range defining information, which indicates the monitoring range registered for the printer 200 of the transmission destination of the printing job, to the printer 200 together with the printing job.

The communication control unit 100 of the printer 200 executes status notification processing of the third illustrative embodiment, which is different from the status notification processing of the first and second illustrative embodiments, by using the range defining information received from the portable device 400. FIG. 17 is a flow chart of the status notification processing of the third illustrative embodiment.

In step S605, the communication control unit 100 acquires the range defining information (FIG. 7) defining the monitoring range from the portable device 400. In step S610, the communication control unit 100 determines whether there is a printing job that is a processing target. The printing job that is a processing target is a printing job that should be executed by the printer 200 corresponding to the acquired range defining information. For example, when the range defining information is transmitted with being included in the printing job to the printer 200, the printing job including the range defining information is the printing job that is a processing target. The acquired range defining information is information defining the three monitoring ranges A1 to A3 shown in FIG. 8, for example.

When there is a printing job that is a processing target (step S610: YES), the communication control unit 100 requests the current position information from the portable device 400 to which a message should be transmitted (step S615). The portable device 400 to which a message should be transmitted is the portable device 400 that is the transmission source of the range defining information. In the below, when describing the status notification processing, the portable device 400 indicates the portable device 400 to which a message should be transmitted in the status notification processing.

When the printer driver 300 of the portable device 400 receives the request for the current position information, the printer driver 300 controls the GPS unit 480 to thus acquire the current position information indicating the current position of the portable device 400. The printer driver 300 transmits the acquired current position information to the printer 200, as a response to the request for the current position information. As a result, in step S620, the communication control unit 100 acquires the current position information from the portable device 400.

In step S625, the communication control unit 100 determines whether the current position of the portable device 400 is within the monitoring range defined by the range defining information, based on the current position information of the portable device 400 and the range defining information. When a plurality of the monitoring ranges is defined, the communication control unit 100 determines whether the current position of the portable device is within one of the monitoring ranges.

When the position of the portable device 400 is not within the monitoring range (step S625: NO), the communication control unit 100 proceeds to step S655. That is, when the position of the portable device 400 is not within the monitoring range, the message transmission to the portable device 400 is not executed. On the other hand, when the position of the portable device 400 is within the monitoring range (step S625: YES), the communication control unit 100 specifies the status of the printer 200, i.e., the current progressing status of the printing job that is a processing target by referring to the status information 222 (step S630). In step S635, the communication control unit 100 acquires a message that is to be displayed in accordance with the specified progressing status and the monitoring range within which the portable device 400 exists (step S635). The message to be displayed is acquired from the message table MT stored in the non-volatile storage device 220.

In step S640, the communication control unit 100 determines whether the message acquired in step S635 is different from a message already transmitted to the portable device 400 in previous time step S650. The message already transmitted in previous time is a message about the printing job that is a processing target, and indicates a message last transmitted to the portable device 400 of the already transmitted messages when there are messages transmitted to the portable device 400. The message already transmitted in previous time is recorded in a predetermined area of the non-volatile storage device 220 or volatile storage device 230, for example.

When the message acquired in step S635 is the same as the message already transmitted in previous time (step S640: NO), the communication control unit 100 determines whether the previous position of the portable device 400 was within the monitoring range within which the portable device 400 currently exists (step S645). The previous position of the portable device 400 is a position that is indicated by the current position information acquired in step S620 of one previous time of last-minute step S620 and is recorded in a predetermined storage area of the non-volatile storage device 220 or volatile storage device 230, for example.

When the previous position of the portable device 400 is beyond the monitoring range (step S645: NO), the communication control unit 100 transmits the message acquired in step S635 to the portable device 400 (step S650). That is, when the current position of the portable device 400 is within the monitoring range (step S625: YES) and the previous position of the portable device 400 is beyond the monitoring range (step S645: NO), a message is transmitted to the portable device 400.

When the message acquired in step S635 is different from the message already transmitted in previous time (step S640: YES), the communication control unit 100 transmits the message to the portable device 400 (step S650). That is, when the current position of the portable device 400 is within the specific range (step S625: YES) and the message is different from the message already transmitted in previous time (step S640: YES), a message is transmitted to the portable device 400, irrespective of the previous position of the portable device 400.

In step S655, the communication control unit 100 determines whether a predetermined time period has elapsed. When the predetermined time period has not elapsed (step S655: NO), the communication control unit 100 stands by until the predetermined time period has elapsed. When the predetermined time period has elapsed (step S655: YES), the communication control unit 100 returns to step 610. As a result, the processing of steps S610 to S650 is periodically repeated. That is, the current position information of the portable device 400 is periodically (for example, at an interval of few seconds), so that when a message transmission condition is satisfied, the message is transmitted to the portable device 400. The message transmission condition is the same as the message display condition that is determined in the portable device 400 in the first and second illustrative embodiments. That is, the message transmission condition is any one of (1) the condition that the portable device 400 is moved from the outside of the valid monitoring range to the inside of the valid monitoring range and (2) the condition that the portable device 400 is within the valid monitoring range and the status information (i.e., the progressing status of the printing processing) is changed. As a result, in the third illustrative embodiment, the related information acquisition unit 340 of the portable device 400 acquires the message from the printer 200 when the message transmission condition is satisfied.

In the meantime, when the related information acquisition unit 340 of the portable device 400 acquires the message from the printer 200, the output processing unit 350 of the portable device 400 displays the message on the display unit 470 of the portable device 400 (FIG. 14).

In step S610, when there is no printing job that is a processing target (step S610: NO), i.e., when the printing job that is a processing target is deleted, the communication control unit 100 ends the status notification processing. The printing job is deleted at appropriate timing by the printing control unit 30, for example. For example, when a predetermined time has elapsed after the printer 200 shifts to the ending state STE, the printing control unit 30 may delete the printing job. Also, when the output of the printed document is normally ended, the printing control unit 30 may delete the printing job upon the collection of the printed document by the user. In the meantime, the collection of the printed document is detected by the sheet sensor that is provided at the sheet discharge tray, for example.

According to the above-described illustrative embodiment, the same operations/effects as the first and second illustrative embodiments are obtained. Also, the portable device 400 can receive the message at appropriate timing just by transmitting the range defining information and the current position information in response to the transmission request. Hence, it is possible to suppress the excessive processing burden on the portable device 400.

D. Modified Embodiments (1) In the respective illustrative embodiments, the related information acquisition unit 340 acquires the message corresponding to the status of the printer 200 and the output processing unit 350 displays the message on the display unit 470. Instead of this configuration, for example, the related information acquisition unit 340 may acquire the printing completion time period Tf, which is calculated in the completion time period specifying processing (FIG. 3), from the printer 200 and the related information acquisition unit 340 may display the printing completion time period Tf on the display unit 470. In this case, the user can appropriately determine the collection timing of the printed document by recognizing the printing completion time period Tf. In general, it is preferable to acquire and display the information (for example, the message or printing completion time period Tf) corresponding to the current status of the printer 200.

Here, it is not strictly required that the current status of the printer 200 should be the status of the printer 200 at timing at which the portable device 400 is moved into the monitoring range or timing at which the message is displayed on the display unit 470. For example, a time lug may occur between the update of the status information 222 by the status information update unit 32 and the shift of the actual status of the printer 200. By the time lug, a deviation between a content of the message displayed on the display unit 470 and the actual status of the printer 200 is permitted.

Also, in the respective illustrative embodiments, the output processing unit 350 of the portable device 400 displays the message on the display unit 470. However, the output processing unit 350 may output the message to the user by other methods. For example, the output processing unit 350 may output a sound that reads out the message or output a sound or vibration associated with the message. In this case, it is preferable to describe an association relation of the message and the sound or vibration in advance for the user by using a manual, for example.

(2) In the respective illustrative embodiments, the status under output ST42 is treated as the status of one printer 200. However, for example, the status under output ST42 may be treated as a plurality of statuses divided depending on the printing completion time period Tf. For example, the message to be transmitted may be changed depending on whether the printing completion time period Tf is longer than a reference time period TH. Also, the invention is not limited to the printing completion time period Tf. For example, the message to be transmitted may be changed in a situation where the printing completion time period Tf is relatively long and a situation where the printing completion time period Tf is relatively short, based on whether the remaining number of sheets to be printed is the reference number of sheets to be printed or larger.

(3) In the respective illustrative embodiments, at least one monitoring range corresponding to the one printer 200 is defined on the basis of the position P1 (the installation position) of the printer 200 (FIG. 8). However, the invention is not limited thereto. For example, all the monitoring ranges corresponding to the one printer 200 may be defined on the basis of a position different from the installation position of the printer 200. The monitoring ranges A11, A12 (FIG. 15) that are defined based on the one position P1 shown in the second illustrative embodiment may be defined on the basis of a position different from the installation position of the printer 200. For example, a range A3 in a sphere having a radius R1 and having the position P2 (FIG. 8) of the door of the room, in which the printer 200 is installed, as a center may be set as the first-type range and a range A4 that is in a sphere having the position P2 as a center and a radius R2 (R2>R1) and is beyond the range A3 may be set as the second-type range. By doing so, the message to be associated between the two monitoring ranges A3, A4 can be changed.

(4) Also, when the printing job is transmitted from the PC 60, like the pattern B (FIG. 11), a monitoring range A5 having the installation position of the printer 200 as a center and a monitoring range A6 having the PC 60 as a center may be respectively registered. In this case, for example, the message notifying an error (the paper jam, the out-of-printing material and the like) that requires the measure for the printer 200 may be displayed when the portable device 400 exists in the monitoring range A5 and may not be displayed when the portable device 400 exists in the monitoring range A6. To the contrary, the message notifying an error (an error requiring the re-transmission of the printing job, and the like) that requires an operation for the PC 60 may be displayed when the portable device 400 exists in the monitoring range A6 and may not be displayed when the portable device 400 exists in the monitoring range A5.

(5) As described above, it may be required that the user of the printer 200 should move to the installation position of the printer 200. For example, when the printed document is output from the printer 200, it is required that the user should move to the printer 200 so as to collect the printed document. Also, when a specific error, specifically, an error requiring a measure for the printer 200 so as to solve the error occurs, such as the out-of-sheet and the paper jam, it is necessary for the user to move to the printer 200 so as to solve the error. Based on the printer characteristics, for example, in the first illustrative embodiment, the content of the message is set (FIG. 9) so that, when the user goes out of the room RM, i.e., when the user becomes distant from the printer 200, the message (specifically, the message that relatively strongly urges the user to collect the printed document) requesting (hereinafter, referred to as the moving request) the user to move to the printer 200 is displayed. For example, comparing the case where the printer 200 is at the specific status (for example, the status under output ST42 (FIG. 9)), when the user is within the second-type range that is arranged at the door of the area (the room or building) in which the printer 200 is installed, the message in which the moving request is more emphasized is displayed on the display unit 470 of the portable device 400, compared to the message that is displayed when the user is within the first-type range that is arranged in the vicinity of the printer 200. Also, in the second illustrative embodiment, the content of the message is set (FIG. 9) so that, when the user stays at a place relatively close to the printer 200, the moving request is displayed, and when the user stays at a place relatively distant from the printer 200, the moving request is not displayed. For example, comparing the case where the printer 200 is at the specific status (for example, the status under output ST42 (FIG. 9)), when the user is within the first-type range that is arranged in the vicinity of the printer 200, the message urging the user to collect the printed document is displayed, and when the user is within the second-type range that is arranged at a position relatively distant from the printer 200, the message urging the user to collect the printed document is not displayed on the display unit 470 of the portable device 400. Generally speaking, the message, which is displayed on the portable device 400 when the portable device 400 is within the first-type range, and the message, which is displayed on the portable device 400 when the portable device 400 is within the second-type range, have or does not have the moving request or have different emphasis degrees on the moving request, preferably.

(6) In the respective illustrative embodiments, the monitoring range is set for each printer (FIG. 7). Instead of this configuration, the monitoring range may be changed for each printer. For example, the monitoring distances D1, D2 (FIG. 8) defining the monitoring ranges may be changed for each printer. For example, it is thought that when printing a document having high confidentiality, the message urging the user to collect the printed document is preferably positively notified even when the portable device 400 is distant from the printer 200. Like this, the monitoring distances D1, D2 defining the monitoring ranges may be changed depending on the security level of the printing job.

(7) In the first illustrative embodiment, the processing (step S515) of determining whether or not to end the monitoring of the target printing job is executed by inquiring of the printer 200 whether the printed document is left at the printer 200. Instead of the inquiry or together with the inquiry, when the user collects the printed document, for example, the user may input the monitoring ending of the target printing job to the portable device 400. In this case, when the monitoring ending of the target printing job is input, the monitoring range managing unit 360 may immediately invalidate the monitoring range and delete the corresponding job ID.

(8) As described above, the message display condition of the first and second illustrative embodiments and the message transmission condition of the third illustrative embodiment are (1) that the portable device 400 is moved from the outside of the valid monitoring range to the inside of the valid monitoring range and (2) that the portable device 400 is within the valid monitoring range and the status information (i.e., the progressing status of the printing processing) is changed. Further, (3) a condition that the portable device 400 is positioned within the valid monitoring range and a predetermined time period has elapsed after the previous message is displayed or the message is transmitted may be added to the message display condition or message transmission condition.

(9) In the related information display processing (FIG. 13) of the first and second illustrative embodiments, the terminal position acquisition unit 330 of the portable device 400 periodically acquires the current position information (step S410). The timing at which the terminal position acquisition unit 330 acquires the current position information may not be periodic. For example, the terminal position acquisition unit 330 may acquire the current position information when the user instructs the portable device 400 to acquire the position information.

(10) In the respective illustrative embodiments, the message that is the related information is displayed on the display unit 470 of the portable device 400 (FIG. 14). Instead of this configuration, the related information may be output from an apparatus different from the portable device 400, for example, from the printer 200. For example, when the portable device 400 exists at a relatively close position from the printer 200, the related information may be voice-output from the printer 200.

(11) Also, in the respective illustrative embodiments, it is possible to set the monitoring ranges in the one target printer. However, one monitoring range may be set in one target printer. In this case, the message associated with the status of the one printer 200 may be one.

(12) The shape of the monitoring range may not be spherical and any two or three-dimensional shape may be adopted. For example, a monitoring range (for example, a rectangular monitoring range) having a shape corresponding to the shape of the room in which the printer 200 is installed may be possible. In this case, one monitoring range may be defined by four positions corresponding to a plurality of positions, for example, apexes of the rectangle.

(13) In the respective illustrative embodiments, the communications between the portable device 400 and the printer 200 and between the PC 60 and the printer 200, specifically, the transmission and reception of the printing job, the current position information of the portable device 400 and the status information are executed using the wireless communication through the access position 50 (the wireless communication in the infrastructure mode). Instead of this configuration, a part or entirety of the communications may be executed using a variety of wireless communications, for example, an ad-hoc mode of the wireless LAN, Wi-Fi direct, Bluetooth (the registered trademark), the infrared communication and the like.

(14) In the respective illustrative embodiments, the portable device 400 has the printer driver 300. However, in the case of the pattern B, the portable device 400 may not have the function of the printing job transmission unit 320 (the function as the printer driver).

(15) In the above illustrative embodiments, a part of the configuration implemented by the hardware may be replaced with software. On the contrary, a part of the configuration implemented by the software may be replaced with the hardware.

(16) When a part or entirety of the functions of the invention is implemented by the software, the software (e.g., computer program) may be provided with being stored in a computer-readable recording medium. The 'computer-readable recording medium' is not limited to a portable recording medium such as a memory card and a CD-ROM and may include an internal storage device in a computer such as RAMs and ROMs and an external storage device that is connected to the computer, such as a hard disk drive.

Although the invention has been described with reference to the illustrative embodiments and the modified embodiments, the illustrative embodiments described above are provided to easily understand the invention, not to limit the invention. The invention can be changed and improved without departing from the gist of the invention and the claims and includes the equivalents thereof.

What is claimed is:

1. A non-transitory computer-readable medium having a computer program stored thereon and readable by a computer of a terminal apparatus, which is configured to perform wireless communication with a printer, the computer program, when executed by the computer, causes the computer to perform operations comprising:

a position registration process of registering information, which indicates a first position for acquiring related information, with a storage unit in the terminal apparatus;

a terminal position acquisition process of acquiring terminal position information indicative of a position of the terminal apparatus;

an information acquisition process of acquiring the related information when the position of the terminal apparatus is within a specific range; and an output process of outputting the acquired related information, wherein the specific range comprises a first range that is defined based on the first position and a second range that is different from the first range, wherein a distance between the terminal apparatus and the printer when the terminal apparatus is in the second range is larger than a distance between the terminal apparatus and the printer when the terminal apparatus is the first range, and wherein the information acquisition process is configured to:

acquire first related information in a case where the position of the terminal apparatus is within the first range, wherein the first related information includes information corresponding to a current status of the printer; and acquire second related information that is different from the first related information in a case where the position of the terminal apparatus is within the second range, wherein the second related information includes a message for urging collection of a printed document.

2. The non-transitory computer-readable medium according to claim 1, wherein the first range is a range having a distance to the first position which is within a first reference value, and wherein the second range is a range having a distance to the first position which is within a second reference value that is larger than the first reference value.

3. The non-transitory computer-readable medium according to claim 1, wherein the position registration process is further configured to register information, which indicates a second position for acquiring the related information, the second position being different from the first position, with the storage unit in the terminal apparatus, wherein the first range is a range that is defined based on the first position, and wherein the second range is a range that is defined based on the second position.

4. The non-transitory computer-readable medium according to claim 3, wherein the first position is a position at which the printer exists, and wherein the second position is a position that is different from the position at which the printer exists.

5. The non-transitory computer-readable medium according to claim 1, wherein the information acquisition process is configured to:

acquire the first related information in a case where the position of the terminal apparatus is within the first range at a state where the current status of the printer is a specific status; and acquire the second related information in a case where the position of the terminal apparatus is within the second range at a state where the current status of the printer is the specific status.

6. The non-transitory computer-readable medium according to claim 1, wherein the position registration process comprises a reception process of receiving a specific operation on the terminal apparatus for registering the first position from a user, and wherein the position registration process is configured to register a position of the terminal apparatus upon reception of the specific operation from the user, as the first position.

7. The non-transitory computer-readable medium according to claim 1, wherein the position registration process is configured to associate and register information indicative of the first position and identification information for identifying the printer with the storage unit of the terminal apparatus, and wherein the position registration process is configured to register identification information for identifying the printer, which is associated information indicative of the first position, with the storage unit of the terminal apparatus.

8. The non-transitory computer-readable medium according to claim 1, wherein the operations further comprise a status change determination process of determining whether status information of the printer has changed after acquiring the related information by the information acquisition process, and wherein the information acquisition process is configured to acquire the related information again in a case where it is determined that the status information of the printer has changed.

9. The non-transitory computer-readable medium according to claim 8, wherein the operations further comprise a position change determination process of determining whether the position of the terminal apparatus has changed after determining whether the status information of the printer has changed by the status change determination process, and wherein the information acquisition process is configured to acquire the related information again in a case where the status change determination process determines that the status information of the printer has not changed and the position change determination process determines that the position of the terminal apparatus has changed.

10. A terminal apparatus configured to perform wireless communication with a printer, the terminal apparatus comprising:

a processor: and a memory storing instructions, the instructions, when executed by the processor, causing the terminal apparatus to:

register information, which indicates a first position for acquiring related information, with a storage unit in the terminal apparatus;

acquire terminal position information indicative of a position of the terminal apparatus;

acquire the related information when the position of the terminal apparatus is within a specific range; and output the acquired related information, wherein the specific range comprises a first range that is defined based on the first position and a second range that is different from the first range, wherein a distance between the terminal apparatus and the printer when the terminal apparatus is in the second range is larger than a distance between the terminal apparatus and the printer when the terminal apparatus is the first range, and wherein the acquiring the related information comprises:
acquire first related information in a case where the position of the terminal apparatus is within the first range, wherein the first related information includes information corresponding to a current status of the printer, and acquire second related information that is different from the first related information in a case where the position of the terminal apparatus is within the second range, wherein the second related information includes a message for urging collection of a printed document.

11. The terminal apparatus according to claim 10, wherein the instructions, when executed by the processor, causes the terminal apparatus to:

receive a specific operation on the terminal apparatus for registering the first position from a user; and register a position of the terminal apparatus upon reception of the specific operation from the user, as the first position.

* * * * *